(12) United States Patent
Lu

(10) Patent No.: US 11,734,111 B2
(45) Date of Patent: *Aug. 22, 2023

(54) INTEGRATED CIRCUIT AND METHOD OF OPERATING SAME

(71) Applicant: TAIWAN SEMICONDUCTOR MANUFACTURING COMPANY, LTD., Hsinchu (TW)

(72) Inventor: Shih-Lien Linus Lu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/816,085

(22) Filed: Jul. 29, 2022

(65) Prior Publication Data

US 2022/0365846 A1 Nov. 17, 2022

Related U.S. Application Data

(63) Continuation of application No. 17/314,716, filed on May 7, 2021, now Pat. No. 11,461,174.

(60) Provisional application No. 63/072,534, filed on Aug. 31, 2020.

(51) Int. Cl.
*G11C 29/00* (2006.01)
*G06F 11/10* (2006.01)
*G06F 21/55* (2013.01)
*G11C 13/00* (2006.01)
*G11C 11/16* (2006.01)

(52) U.S. Cl.
CPC ........ *G06F 11/1068* (2013.01); *G06F 21/552* (2013.01); *G06F 2221/034* (2013.01); *G11C 11/1675* (2013.01); *G11C 13/0004* (2013.01); *G11C 13/0069* (2013.01)

(58) Field of Classification Search
CPC ............. G06F 2221/034; G06F 21/552; G06F 11/1068; G06F 11/1675; G11C 13/0069; G11C 13/0004
See application file for complete search history.

(56) References Cited

U.S. PATENT DOCUMENTS 7,587,658 B1 9/2009 Tong et al.
9,778,985 B1 10/2017 Kim
11,461,174 B2 * 10/2022 Lu .......................... G06F 21/552
(Continued)

FOREIGN PATENT DOCUMENTS

KR 20110080516 7/2011
KR 20130009389 1/2013

*Primary Examiner* — Samir W Rizk
(74) *Attorney, Agent, or Firm* — Hauptman Ham, LLP

(57) ABSTRACT

An integrated circuit includes a first set of inverters configured to receive a first set of check bits, and to generate a second set of check bits, a first memory cell array including a first portion of memory cells configured to store a first set of data, and a second portion of memory cells configured to store the second set of check bits, a second set of inverters to receive a third set of check bits, and to generate a fourth set of check bits, and an error correction code decoder configured to detect or correct an error in a second set of data or the fourth set of check bits thereby generating a set of output data and a been-attacked signal. The second set of data corresponds to the first set of data. The been-attacked signal indicates a reset attack by a user.

20 Claims, 14 Drawing Sheets

(56) References Cited

U.S. PATENT DOCUMENTS

| | | |
|---|---|---|
| 2003/0066005 A1 | 4/2003 | Iglesia et al. |
| 2004/0255225 A1 | 12/2004 | Takai |
| 2008/0215955 A1 | 9/2008 | Kimbara et al. |
| 2018/0151197 A1 | 5/2018 | Kim |
| 2020/0104205 A1 | 4/2020 | Noguchi et al. |

\* cited by examiner

INTEGRATED CIRCUIT AND METHOD OF OPERATING SAME

PRIORITY CLAIM

The present application is a continuation of U.S. application Ser. No. 17/314,716, filed May 7, 2021, now U.S. Pat. No. 11,461,174, issued Oct. 4, 2022, which claims the benefit of U.S. Provisional Application No. 63/072,534, filed Aug. 31, 2020, which are herein incorporated by reference in their entireties.

BACKGROUND

The semiconductor integrated circuit (IC) industry has produced a wide variety of digital devices to address issues in a number of different areas. Some of these digital devices, such as memory macros, are configured for the storage of data. As ICs have become smaller and more complex, the resistance of conductive lines within these digital devices are also changed affecting the operating voltages of these digital devices and overall IC performance.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
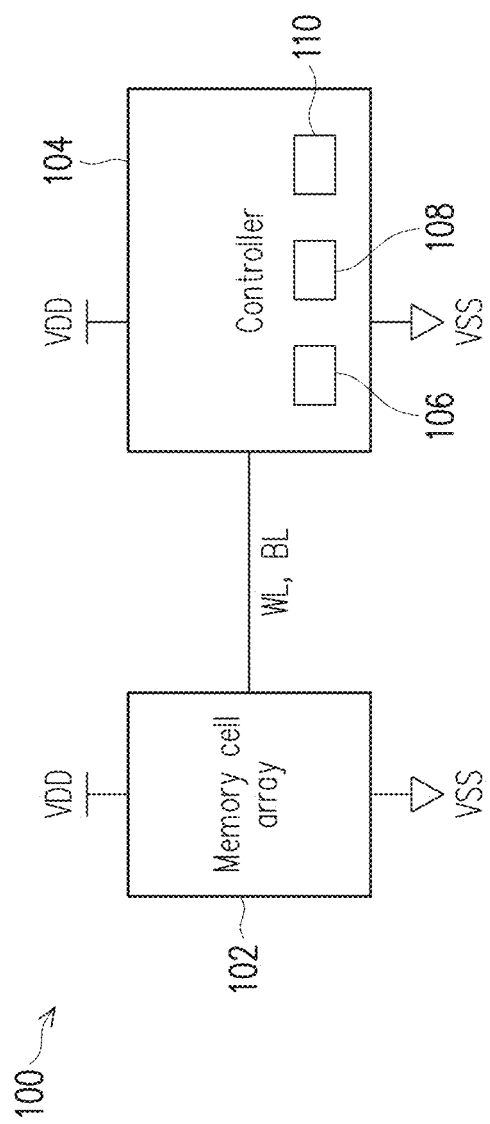
FIG. 1 is a block diagram of an integrated circuit, in accordance with some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with some embodiments, an integrated circuit includes an ECC encoder, a first memory cell array, and an ECC decoder. In some embodiments, the ECC encoder is configured to generate a first set of check bits in response to data. In some embodiments, the first set of check bits are stored in an inverted or a complementary form in the first memory cell array.

In some embodiments, before decoding the first set of inverted check bits, the first set of inverted check bits are inverted again thereby generating a second set of check bits, and then the ECC decoder is configured to decode the second set of check bits to at least detect or correct an error in the data or the first set of check bits.

In some embodiments, the ECC decoder is also configured to determine reset attacks by a user on the first memory cell by detecting invalid or corrupted codewords (e.g., data and the first set of check bits). In some embodiments, compared to other approaches that use a separate sensor to detect reset attacks, the integrated circuit of the present disclosure is able to detect reset attacks without including a separate sensor thereby occupying less area than other approaches.

Integrated Circuit

FIG. 1 is a block diagram of an integrated circuit 100, in accordance with some embodiments. In the embodiment of FIG. 1, integrated circuit 100 is a memory macro.

Integrated circuit 100 includes a memory cell array 102 and a controller 104. Memory cell array 102 is coupled to controller 104. In some embodiments, memory cell array 102 is coupled to controller 104 by at least bit lines BL (FIG. 2) or word lines WL or other conductive lines. Controller 104 is configured to control memory cell array 102. In some embodiments, controller 104 is configured to provide error correction encoding (ECC), decoding and correction (described below) for integrated circuit 100.

Figure 2:
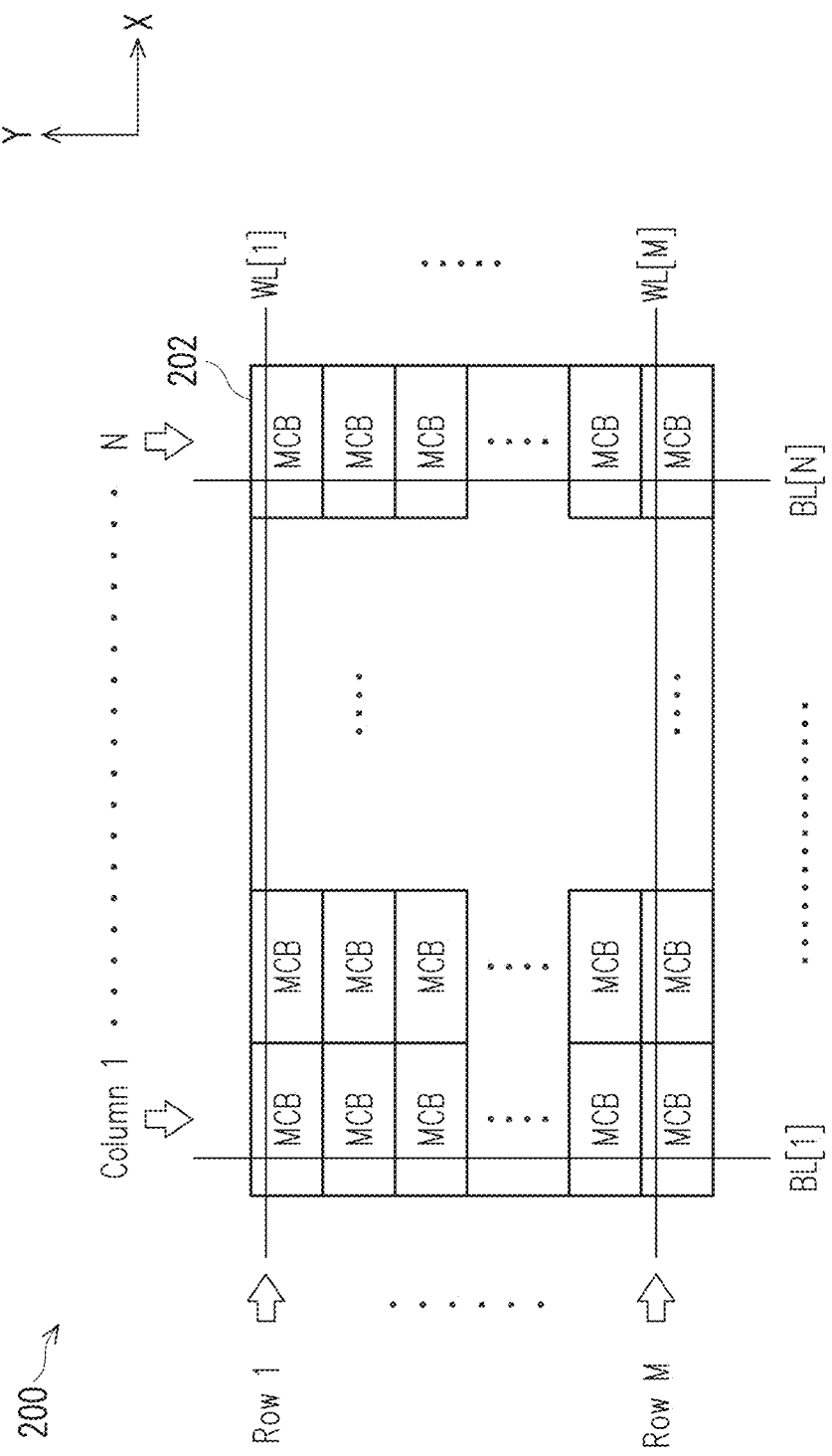
FIG. 2 is a circuit diagram of a memory circuit, in accordance with some embodiments.

Memory cell array 102 comprises an array of memory cells having M rows and L columns, where M and L are positive integers (shown in FIG. 2). In some embodiments, each memory cell in memory cell array 102 is configured to store one (1) bit of data. In some embodiments, each memory cell in memory cell array 102 is configured to store more than one (1) bit of data.

In some embodiments, memory cell array 102 is a non-volatile memory cell array including non-volatile memory cells. In some embodiments, each memory cell in memory cell array 102 corresponds to a magnetoresistive random-access memory (MRAM) cell. In some embodiments, each memory cell in memory cell array 102 corresponds to a phase-change memory (PCM) cell. In some embodiments, each memory cell in memory cell array 102 corresponds to a phase-change RAM (PRAM) cell. In some embodiments, each memory cell in memory cell array 102 corresponds to a Ferroelectric RAM (FeRAM) cell. In some embodiments, each memory cell in memory cell array 102 corresponds to a Ferroelectric Field Effect Transistor (FeFET) cell.

Other types of memory cells in memory cell array 102 are within the scope of the present disclosure. Other configurations of memory cell array 102 are within the scope of the present disclosure.

Controller 104 includes an X-decoder circuit 106, a Y-decoder circuit 108 and an ECC encoder/decoder 110.

X-decoder circuit 106 is coupled to (not shown) memory cell array 102 by word lines WL. X-decoder circuit 106 is configured to generate word line signals (not shown) on corresponding word lines WL to memory cell array 102. In some embodiments, X-decoder circuit 106 includes word line driver circuits (not shown) coupled to the word lines WL, and the word line driver circuits (not shown) are configured to generate the word line signals that are sent to memory cell array 102.

In some embodiments, word line driver circuits (not shown) decode a row address of a memory cell in memory cell array 102 that is selected to be accessed in a read operation or a write operation. In some embodiments, the word line driver circuits (not shown) then supply a voltage to the selected word line corresponding to the decoded row address, and a different voltage to the other, unselected word lines. In some embodiments, the X-decoder circuit 106 is configured to generate the word line signals in response to a first set of control signals (not shown) received from controller 104.

Other configurations of X-decoder circuit 106 are within the scope of the present disclosure.

Y-decoder circuit 108 is coupled to (not shown) memory cell array 102 by bit lines BL. Y-decoder circuit 108 is configured to generate bit line signals (not shown) on corresponding bit lines BL to memory cell array 102.

In some embodiments, Y-decoder circuit 108 includes bit line driver circuits (not shown) coupled to the bit lines BL, and the bit line driver circuits (not shown) are configured to generate the bit line signals that are sent to memory cell array 102.

In some embodiments, bit line driver circuits (not shown) decode a column address of a memory cell in memory cell array 102 selected to be accessed in a write operation. In some embodiments, bit line driver circuits (not shown) then supply a voltage to the selected bit line corresponding to the decoded column address. In some embodiments, the Y-decoder circuit 108 is configured to generate the bit line signals in response to a second set of control signals (not shown) received from controller 104.

Other configurations of Y-decoder circuit 108 are within the scope of the present disclosure.

ECC encoder/decoder 110 is coupled to memory cell array 102 (not shown). ECC encoder/decoder 110 is configured to provide ECC encoding, decoding, error detection and error correction for data stored in memory cell array 102. In some embodiments, ECC encoder/decoder 110 includes a Hamming ECC encoder/decoder, a Hsiao ECC encoder/decoder, a Reed-Solomon ECC encoder/decoder 110, a Bose-Chaudhuri-Hocquenghem (BCH) ECC encoder/decoder 110, or the like. Other ECCs or error detection methods are within the scope of various embodiments.

In some embodiments, two or more of at least memory cell array 102, X-decoder circuit 106, Y-decoder circuit 108 or ECC encoder/decoder 110 are combined into a single circuit. Other configurations of ECC encoder/decoder 110 are within the scope of the present disclosure.

In some embodiments, integrated circuit 100 corresponds to at least a radio frequency identification (RFID) card, a bank card, a payment card, or an identification (ID) card. In some embodiments, integrated circuit 100 corresponds to an intermittently powered device such as an internet of things (IoT) device. In some embodiments, memory cell array 102 is configured to store sensitive data. In some embodiments, memory cell array 102 is configured to store a security key that is useable to provide data integrity. Thus, some users may perform a reset attack of integrated circuit 100 by attempting to reset or change the contents of the data stored in memory cell array 102. For example, if the memory cell array 102 includes PCM cells, some users may heat up the memory cell array 102 in an attempt to cause the stored logic state of each of the PCM cells to change from a logic 1 to a logic 0 or vice versa, thereby compromising the data stored in memory cell array 102. For example, if the memory cell array 102 includes MRAM cells, some users may apply a magnetic field to the memory cell array 102 in an attempt to cause the stored logic state of each of the MRAM cells to change from a logic 1 to a logic 0 or vice versa, thereby compromising the data stored in memory cell array 102.

In some embodiments, ECC encoder/decoder 110 is configured to determine whether the memory cell array 102 has been attacked by a user. In some embodiments, ECC encoder/decoder 110 is configured to determine whether the memory cell array 102 has been attacked by a user by detecting an invalid codeword stored in the memory cell array 102. In some embodiments, a codeword is a combination of data bits and check bits. In some embodiments, the check bits are generated by ECC encoder/decoder 110 based on the data bits.

In some embodiments, ECC encoder/decoder 110 is configured to detect valid and invalid codewords based on the type of ECC used and designating certain data and check bits (e.g., codewords) as invalid. In some embodiments, controller 104 is configured to store valid codewords in memory cell array 102, and to not intentionally store invalid codewords in memory cell array 102. Thus, storing an invalid codeword in memory cell array 102 indicates data corruption. In some embodiments, an invalid codeword includes a series of all logic 0's or a series of all logic 1's. In some embodiments, if a user attempts a reset attack by causing the stored logic state of each memory cell in memory cell array 102 to be all logic 0's or all logic 1's, ECC encoder/decoder 110 is configured to detect the stored codeword as an invalid codeword, and thus determines that memory cell array 102 has been attacked by the user.

In some embodiments, compared to other approaches that use a separate sensor to detect a reset attack, integrated circuit 100 is able to detect the reset attack without including a separate sensor. In some embodiments, by not including a separate sensor to detect a reset attack, integrated circuit 100 occupies less area than other approaches. In some embodiments, integrated circuit 100 uses the existing ECC architecture of ECC encoder/decoder 110 to detect the reset attack thereby using less overhead than other approaches.

Other configurations of integrated circuit 100 are within the scope of the present disclosure.

Memory Circuit

FIG. 2 is a circuit diagram of a memory circuit 200, in accordance with some embodiments.

Memory circuit 200 is an embodiment of memory cell array 102 of FIG. 1, and similar detailed description is therefore omitted.

Components that are the same or similar to those in one or more of FIGS. 1-14 are given the same reference numbers, and detailed description thereof is thus omitted.

Memory circuit 200 comprises a memory cell array 202 having M rows and L columns of memory cells MCB, where L is a positive integer corresponding to the number of columns in memory cell array 202 and M is a positive integer corresponding to the number of rows in memory cell array 202. The rows of cells in memory cell array 202 are arranged in a first direction X. The columns of cells in memory cell array 202 are arranged in a second direction Y. The second direction Y is different from the first direction X. In some embodiments, the second direction Y is perpendicular to the first direction X.

In some embodiments, each memory cell MCB in memory cell array 202 is configured to store a bit of data. In some embodiments, memory circuit 200 is logic based memory.

The number of rows M in memory cell array 202 is equal to or greater than 1. The number of columns N in memory cell array 202 is equal to or greater than 1. Different types of memory cells MCB in memory cell array 202 are within the contemplated scope of the present disclosure.

Memory circuit 200 further includes N bit lines BL[1], ... BL[N] (collectively referred to as "bit line BL"). Each column 1, ... , N in memory cell array 202 is overlapped and coupled to a corresponding bit line BL[1], ... BL[N]. Each bit line BL extends in the second direction Y and over a column of cells (e.g., column 1, ... , N).

Memory circuit 200 further includes M word lines WL[1], ... WL[M] (collectively referred to as "word line WL"). Each row 1, ... , M in memory cell array 202 is overlapped and coupled to a corresponding word line WL[1], ... , WL[M]. Each word line WL extends in the first direction X and over a row of cells (e.g., row 1, ... , M).

Other configurations of memory circuit 200 are within the scope of the present disclosure. In some embodiments, one or more of bit lines BL or word lines WL are not included in memory circuit 200. In some embodiments, one or more of bit lines BL or word lines WL are replaced with a corresponding source line SL or a corresponding source line SL is added.

Integrated Circuit

Figure 3:
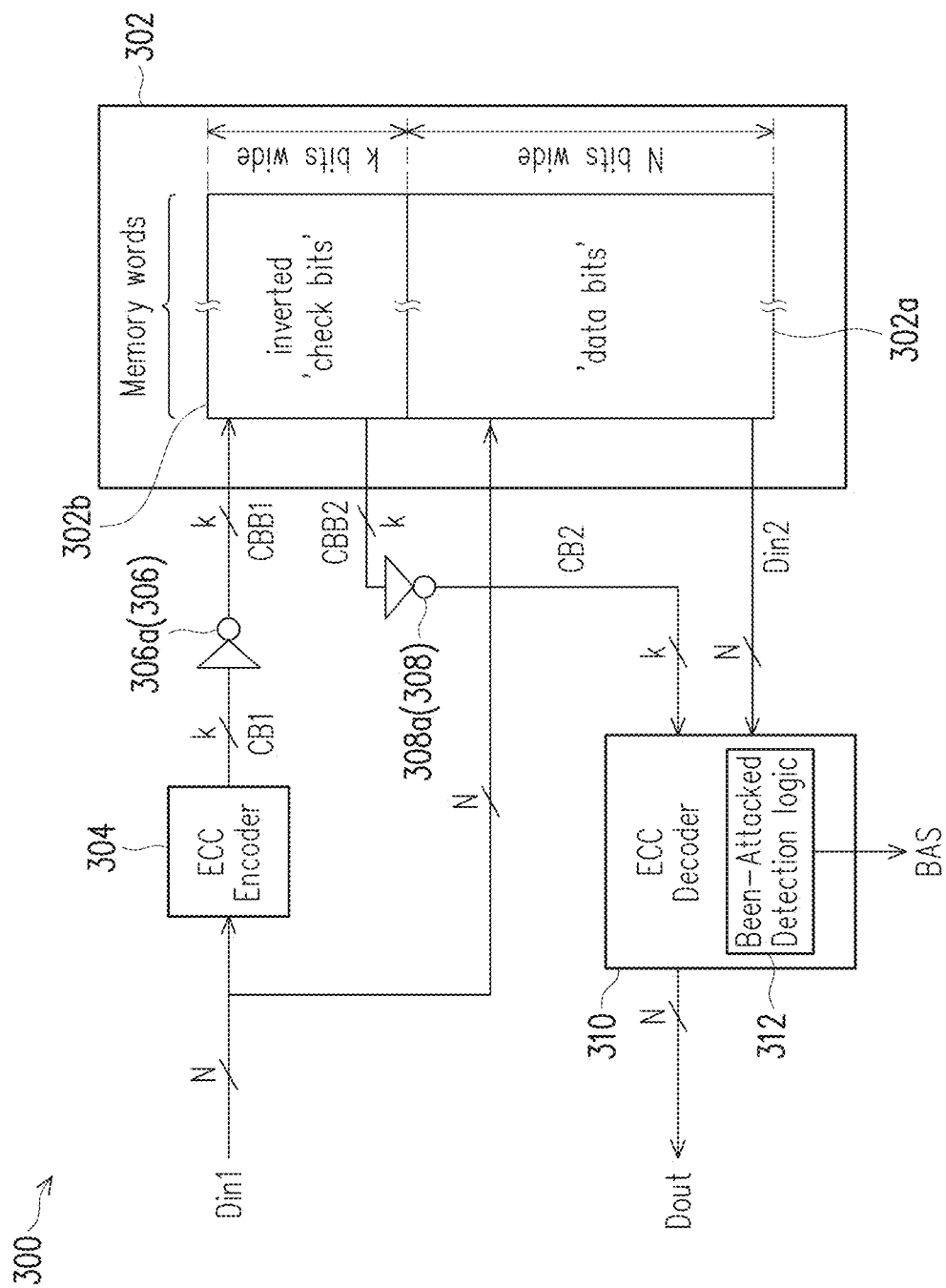
FIG. 3 is a block diagram of an integrated circuit useable in FIG. 1, in accordance with some embodiments.

FIG. 3 is a block diagram of an integrated circuit 300 usable in FIG. 1, in accordance with some embodiments.

Integrated circuit 300 relates to integrated circuit 100 of FIG. 1. Integrated circuit 300 is an embodiment of integrated circuit 100, and similar detailed description is omitted.

Integrated circuit 300 includes a memory cell array 302, an ECC encoder 304, a set of inverters 306, a set of inverters 308 and an ECC decoder 310.

In some embodiments, ECC encoder 304, set of inverters 306, set of inverters 308 and ECC decoder 310 are an embodiment of ECC encoder/decoder 110 of FIG. 1, and similar detailed description is omitted Integrated circuit 300 is configured to receive a set of data Din, and to generate a set of output data Dout. Integrated circuit 300 is configured to provide ECC encoding, decoding, error detection and error correction for data stored in memory cell array 302. Integrated circuit 300 is further configured to generate a been-attacked signal BAS. In some embodiments, a value of the been-attacked signal BAS indicates whether a reset attack by a user has been detected.

ECC encoder 304 is configured to receive a set of data Din. Set of data Din includes N bits, where N is an integer corresponding to the number of bits in set of data Din. ECC encoder 304 is configured to generate a set of parity check bits (hereinafter referred to as "check bits") CB1 in response to a set of data Din.

Set of check bits CB1 includes at least check bits CB1$a$, CB1$b$, ... , CB1$j$ or CB1$k$, where k is an integer corresponding to the number of bits in set of check bits CB1. In some embodiments, k is less than N.

The set of inverters 306 is coupled between ECC encoder 304 and the second portion of memory cells 302$b$. The set of inverters 306 is configured to generate a set of check bits CBB1 in response to the set of check bits CB1. Set of check bits CBB1 includes at least check bits CBB1$a$, CBB1$b$, ... , CBB1$j$ or CBB1$k$. The set of check bits CBB1 includes k bits. Each check bit in the set of check bits CBB1 is associated with each corresponding check bit in the set of check bits CB1. Stated differently, at least check bit CBB1$a$, CBB1$b$, ... , CBB1$j$ or CBB1$k$ of the set of check bits CBB1 corresponds to at least check bit CB1$a$, CB1$b$, ... , CB1$j$ or CB1$k$ of the set of check bits CB1.

In some embodiments, at least one check bit of the set of check bits CBB1 is inverted or complementary from at least one corresponding bit of the set of check bits CB1.

The set of inverters 306 includes at least inverter 306$a$, 306$b$, ... , 306$j$ or 306$k$. Each inverter of the set of inverters 306 is coupled in parallel to each other. Each inverter of the set of inverters 306 has a corresponding input terminal coupled to the output terminal of the ECC encoder 304. Each inverter of the set of inverters 306 has a corresponding output terminal coupled to a corresponding memory cell (not shown) in the second portion of memory cells 302$b$.

In some embodiments, a number of inverters in the set of inverters 306 is one or more. For example, in some embodiments, the set of inverters 306 includes k inverters (306$a$, ... , 306$k$), and each inverter of the set of inverters 306 is configured to invert the corresponding check bit of the set of check bits CB1, thereby generating set of check bits CBB. In this embodiment, each check bit of the set of check bits CBB1 is inverted or complementary from each corresponding bit of the set of check bits CB1.

For example, in some embodiments, the set of inverters 306 includes 1 inverter 306$a$ (e.g., inverter 306$a$), and inverter 306$a$ of the set of inverters 306 is configured to invert the check bit CB1$a$ of the set of check bits CB1, thereby generating check bit CBB1$a$ of the set of check bits CBB1. In this embodiment, the set of check bits CBB1 includes check bits CBB1$a$, CBB1$b$, CBB1$c$, ... , CBB1$k$. In this embodiment, check bit CBB1$a$ is inverted or complementary from check bit CB1$a$, and check bits CBB1$b$, CBB1$c$, ... , CBB1$k$ are equal to corresponding check bits CB1$b$, CB1$c$, ... , CB1$k$. Thus, in this embodiment, the set of check bits CBB1 includes check bits CBB1$a$, CB1$c$, ... , CB1$k$, and check bit CBB1$a$ is inverted or complementary from check bit CB1$a$.

Memory cell array 302 corresponds to a portion of memory cell array 102 of FIG. 1 or integrated circuit 200 of FIG. 2, and similar detailed description is omitted.

The memory cell array 302 includes a first portion of memory cells 302a and a second portion of memory cells 302b. Each memory cell in the first portion of memory cells 302a and the second portion of memory cells 302b is configured to store a bit of data.

The first portion of memory cells 302a is configured to store the set of data Din1. The second portion of memory cells 302b is coupled to the set of inverters 306, and is configured to store set of check bits CBB1. In some embodiments, if the number of inverters in the set of inverters 306 is less than k, then one or more memory cells in the first portion of memory cells 302a are coupled to the ECC encoder 304.

The set of inverters 308 is coupled between the second portion of memory cells 302b and the ECC decoder 310. The set of inverters 308 is configured to receive a set of check bits CBB2, and is configured to generate a set of check bits CB2 in response to the set of check bits CBB2.

Set of check bits CBB2 includes at least check bits CBB2a, CBB2b, ..., CBB2j or CBB2k. The set of check bits CBB2 includes k bits.

In some embodiments, the set of check bits CBB2 corresponds to the set of check bits CBB1 stored in the second portion of memory cells 302b. In some embodiments, if the data stored in the second portion of memory cells 302b is not corrupted, then the set of check bits CBB2 is equal to the set of check bits CBB1. In some embodiments, if the data stored in the second portion of memory cells 302b is corrupted, then the set of check bits CBB2 is not equal to the set of check bits CBB1.

Set of check bits CB2 includes at least check bits CB2a, CB2b, ..., CB2j or CB2k. The set of check bits CB2 includes k bits.

Each check bit in the set of check bits CBB2 is associated with each corresponding check bit in the set of check bits CBB1 or each corresponding check bit in the set of check bits CB2. Stated differently, at least check bit CBB2a, CBB2b, ..., CBB2j or CBB2k of the set of check bits CBB2 corresponds to at least check bit CBB1a, CBB1b, ..., CBB1j or CBB1k of the set of check bits CBB1 or at least check bit CB2a, CB2b, ..., CB2j or CB2k of the set of check bits CB2.

In some embodiments, at least one check bit of the set of check bits CBB2 is inverted or complementary from at least one corresponding bit of the set of check bits CB2.

The set of inverters 308 includes at least inverter 308a, 308b, ..., 308j or 308k. Each inverter of the set of inverters 308 is coupled in parallel to each other. Each inverter of the set of inverters 308 has a corresponding input terminal coupled to the output terminal of the ECC encoder 304. Each inverter of the set of inverters 308 has a corresponding output terminal coupled to a corresponding memory cell (not shown) in the second portion of memory cells 302b.

A number of inverters in the set of inverters 308 is equal to a number of inverters in the set of inverters 306. For example, in some embodiments, the set of inverters 306 includes k inverters (306a, ..., 306k), so the set of inverters 308 includes k inverters (308a, ..., 308k), and each inverter of the set of inverters 308 is configured to invert the corresponding check bit of the set of check bits CBB2, thereby generating set of check bits CB2. In this embodiment, each check bit of the set of check bits CB2 is inverted or complementary from each corresponding bit of the set of check bits CBB2.

Each inverter of the set of inverters 306 corresponds with each inverter of the set of inverters 308. Thus, each check bit of the set of check bits CBB1 that is inverted by a corresponding inverter in the set of inverters 306 is in a corresponding path that also includes a corresponding inverter of the set of inverters 308, and check bits in paths that do not include an inverter from the set of inverters 306, also do not include an inverter from the set of inverters 308. For example, in some embodiments, the set of inverters 306 includes 1 inverter (e.g., inverter 306a) configured to invert check bit CB1a thereby generating check bit CBB1a of the set of check bits CBB1, and therefore the set of inverters 308 includes 1 inverter (e.g., inverter 308a), and inverter 308a of the set of inverters 308 is configured to invert check bit CBB2a of the set of check bits CBB2, thereby generating check bit CB2a of the set of check bits CB2. In this embodiment, the set of check bits CB2 includes check bits CB2a, CB2b, CB2c, ..., CB2k. In this embodiment, check bit CB2a is inverted or complementary from check bit CBB2a, and check bits CB2b, CB2c, ..., CB2k are equal to corresponding check bits CBB2b, CBB2c, ..., CBB2k. Thus, in this embodiment, the set of check bits CB2 includes check bits CB2a, CB2b, CB2c, ..., CB2k, and check bit CB2a is inverted or complementary from check bit CBB2a.

ECC decoder 310 is coupled to the set of inverters 308 and the first portion of memory cells 302a. ECC decoder 310 is configured to receive a set of data Din2 and the set of check bits CB2.

Set of data Din2 includes N bits, where N is an integer corresponding to the number of bits in set of data Din or set of data Din2. Each bit in the set of data Din2 is associated with each corresponding bit in the set of data Din1. Stated differently, at least bit Din1a, Din1b, ..., Din1m or Din1n of the set of data Din1 corresponds to at least bit Din2a, Din2b, ..., Din2m or Din2n of the set of data Din2.

ECC decoder 310 is configured to at least detect or correct an error in at least the set of data Din2 or the set of check bits CB2 thereby generating at least a set of output data Dout and a been-attacked signal BAS. In some embodiments, the been-attacked signal BAS indicates a reset attack by a user.

In some embodiments, the set of output data Dout is equal to the set of data Din1. In some embodiments, the set of output data Dout is equal to the set of data Din2 thus indicating that data stored in the first portion of memory cells 302a is not corrupted. In some embodiments, the set of output data Dout is not equal to the set of data Din2 thus indicating that data stored in the first portion of memory cells 302a is corrupted.

In some embodiments, the set of data Din2 corresponds to the set of data Din1 stored in the first portion of memory cells 302a. In some embodiments, if the data stored in the first portion of memory cells 302a is not corrupted, then the set of data Din2 is equal to the set of data Din1. In some embodiments, if the data stored in the first portion of memory cells 302a is corrupted, then the set of data Din2 is not equal to the set of data Din1.

ECC decoder 310 includes a been-attacked logic gate 312. Been-attacked logic gate 312 is configured to generate the been-attacked signal BAS.

Been-attacked logic gate 312 is configured to determine if memory cell array 302 has been attacked by the user. In some embodiments, been-attacked logic gate 312 is configured to determine if memory cell array 302 has been attacked by the user by generating the been-attacked signal BAS thereby detecting whether an invalid codeword is stored in the first portion of memory cells and the second portion of memory cells 302b. In some embodiments, the invalid codeword includes the set of check bits CB2 and the set of data Din2.

Other configurations of integrated circuit 300 are within the scope of the present disclosure.

Integrated circuit 300 achieves the benefits discussed above with respect to integrated circuit 100 of FIG. 1.

Logic Gate

Figure 4:
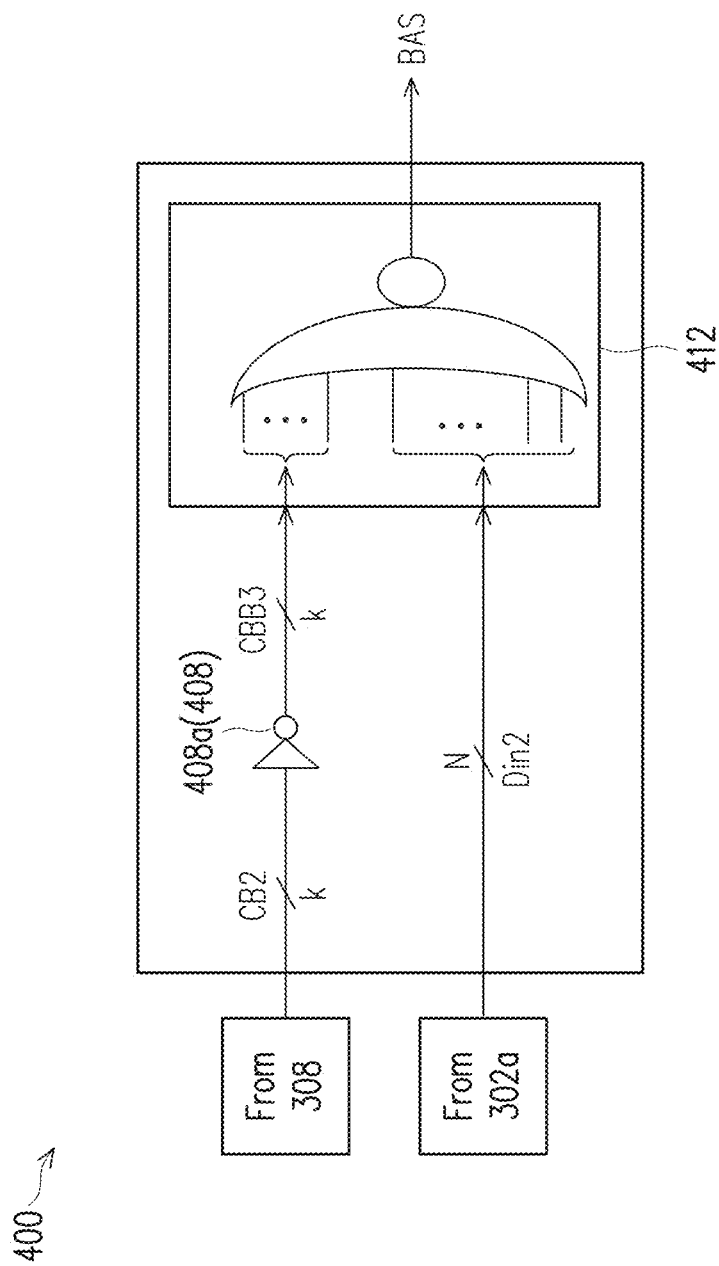
FIG. 4 is a block diagram of a logic gate, in accordance with some embodiments.

FIG. 4 is a block diagram of a logic gate 400, in accordance with some embodiments.

Logic gate 400 is an embodiment of the been-attacked logic gate 312 of FIG. 3, and similar detailed description is omitted.

Logic gate 400 includes a set of inverters 408 and a NOR logic gate 412.

The set of inverters 408 is coupled between the set of inverters 308 and the NOR logic gate 412.

The set of inverters 408 is configured to receive the set of check bits CB2, and is configured to generate a set of check bits CBB3 in response to the set of check bits CB2.

Set of check bits CBB3 includes at least check bits CBB3a, CBB3b, . . . , CBB3j or CBB3k. The set of check bits CBB3 includes k bits.

In some embodiments, the set of check bits CBB3 corresponds to the set of check bits CBB2. Each check bit in the set of check bits CBB3 is associated with each corresponding check bit in the set of check bits CB2. Stated differently, at least check bit CBB3a, CBB3b, . . . , CBB3j or CBB3k of the set of check bits CBB3 corresponds to at least check bit CB2a, CB2b, . . . , CB2j or CB2k of the set of check bits CB2.

In some embodiments, at least one check bit of the set of check bits CBB3 is inverted or complementary from at least one corresponding bit of the set of check bits CB2.

The set of inverters 408 includes at least inverter 408a, 408b, . . . , 408j or 408k. Each inverter of the set of inverters 408 is coupled in parallel to each other. Each inverter of the set of inverters 408 has a corresponding input terminal coupled to the corresponding output terminal of the set of inverters 308. Each inverter of the set of inverters 408 has a corresponding output terminal coupled to a corresponding terminal of NOR logic gate 412.

Each inverter of the set of inverters 306 and 308 corresponds with each inverter of the set of inverters 408. A number of inverters in the set of inverters 408 is equal to a number of inverters in the set of inverters 306 and 308. For example, in some embodiments, the set of inverters 306 includes k inverters (306a, . . . , 306k), and the set of inverters 308 includes k inverters (308a, . . . , 308k), so the set of inverters 408 includes k inverters (408a, . . . , 408k), and each inverter of the set of inverters 408 is configured to invert the corresponding check bit of the set of check bits CB2, thereby generating set of check bits CBB3. In this embodiment, each check bit of the set of check bits CBB3 is inverted or complementary from each corresponding bit of the set of check bits CB2.

In some embodiments, the set of inverters 306 includes 1 inverter (e.g., inverter 306a) configured to invert check bit CB1a thereby generating check bit CBB1a of the set of check bits CBB1, and therefore the set of inverters 308 includes 1 inverter (e.g., inverter 308a). In this embodiment, inverter 308a of the set of inverters 308 is configured to invert check bit CBB2a of the set of check bits CBB2, thereby generating check bit CB2a of the set of check bits CB2, and therefore the set of inverters 408 includes 1 inverter (e.g., inverter 408a and is coupled to inverter 308a). In this embodiment, inverter 408a of the set of inverters 408 is configured to invert check bit CB2a of the set of check bits CB2, thereby generating check bit CBB3a of the set of check bits CBB3. In this embodiment, the output terminal of inverter 408a of the set of inverters 408 is coupled to an input terminal of the NOR logic gate 412, and the other input terminals of the NOR logic gate 412 are coupled to the first portion of memory cells 302a and the output terminals of inverters 308b, . . . , 308k of the set of inverters 308.

In this embodiment, the set of check bits CBB3 includes check bits CBB3a, CBB3b, CBB3c, . . . , CBB3k. In this embodiment, check bit CBB3a is inverted or complementary from check bit CB2a, and check bits CBB3b, CBB3c, . . . , CBB3k are equal to corresponding check bits CB2b, CB2c, . . . , CB2k. Thus, in this embodiment, the set of check bits CBB3 includes check bits CBB3a, CB2b, CB2c, . . . , CB2k, and check bit CBB3a is inverted or complementary from check bit CB2a.

The NOR logic gate 412 is coupled to the first portion of memory cells 302a and the set of inverters 408. Each input terminal of the NOR logic gate 412 is coupled to a corresponding memory cell of the first portion of memory cells 302a or a corresponding output terminal of the set of inverters 308 or 408. The NOR logic gate 412 has N+k input terminals.

The NOR logic gate 412 is configured to generate the been-attacked signal BAS in response to the set of check bits CBB3 and the set of data Din2. Other configurations or types of logic gates for NOR logic gate 412 are within the scope of the present disclosure.

A non-limiting example of operation of integrated circuit 300 and logic gate 400 are hereinafter disclosed illustrating a reset attack by a user. In this non-limiting example, if the set of data Din is 0101, the check bits CB2 is 010 and the set of inverters 308 includes 3 inverters, then integrated circuit 300 stores the 0101 (e.g., data Din) in the first portion of memory cell 302a, set of inverters 306 generates the check bits CBB2 as 101, and the 101 (e.g., check bits CBB2) is stored in the second portion of memory cell 302b. In this non-limiting example, if the user resets the data stored in the first portion of memory cell 302a and the second portion of memory cell 302b to be all 0's (e.g., 0000000), then the set of data Din2 is 0000, and the set of check bits CBB2 is 000. In this non-limiting example, the set of inverters 308 generates the check bits CB2 as 111, and the set of inverters 408 generates the set of check bits CBB3 as 000.

In this non-limiting example, the NOR logic gate performs a NOR logic operation on the 000 (e.g., set of check bits CBB3) and the 0000 (e.g., set of data Din2), and outputs a logic 1 as the been-attacked signal BAS. In some embodiments, a value of logic 1 for the been-attacked signal BAS indicates that an attack was detected or occurred, and a value of logic 0 for the been-attacked signal BAS indicates that an attack was not detected or did not occur.

Other values or number of bits for the been-attacked signal BAS are within the scope of the present disclosure. For example, in some embodiments, a value of logic 0 for the been-attacked signal BAS indicates that an attack was detected or occurred, and a value of logic 1 for the been-attacked signal BAS indicates that an attack was not detected or did not occur. In some embodiments, the set of inverters 306, 308 and 408 are replaced by other logic circuits performing the same logic function.

Other configurations of logic gate 400 are within the scope of the present disclosure.

Logic gate 400 achieves the benefits discussed above with respect to integrated circuit 100 of FIG. 1.

Integrated Circuit

Figure 5:
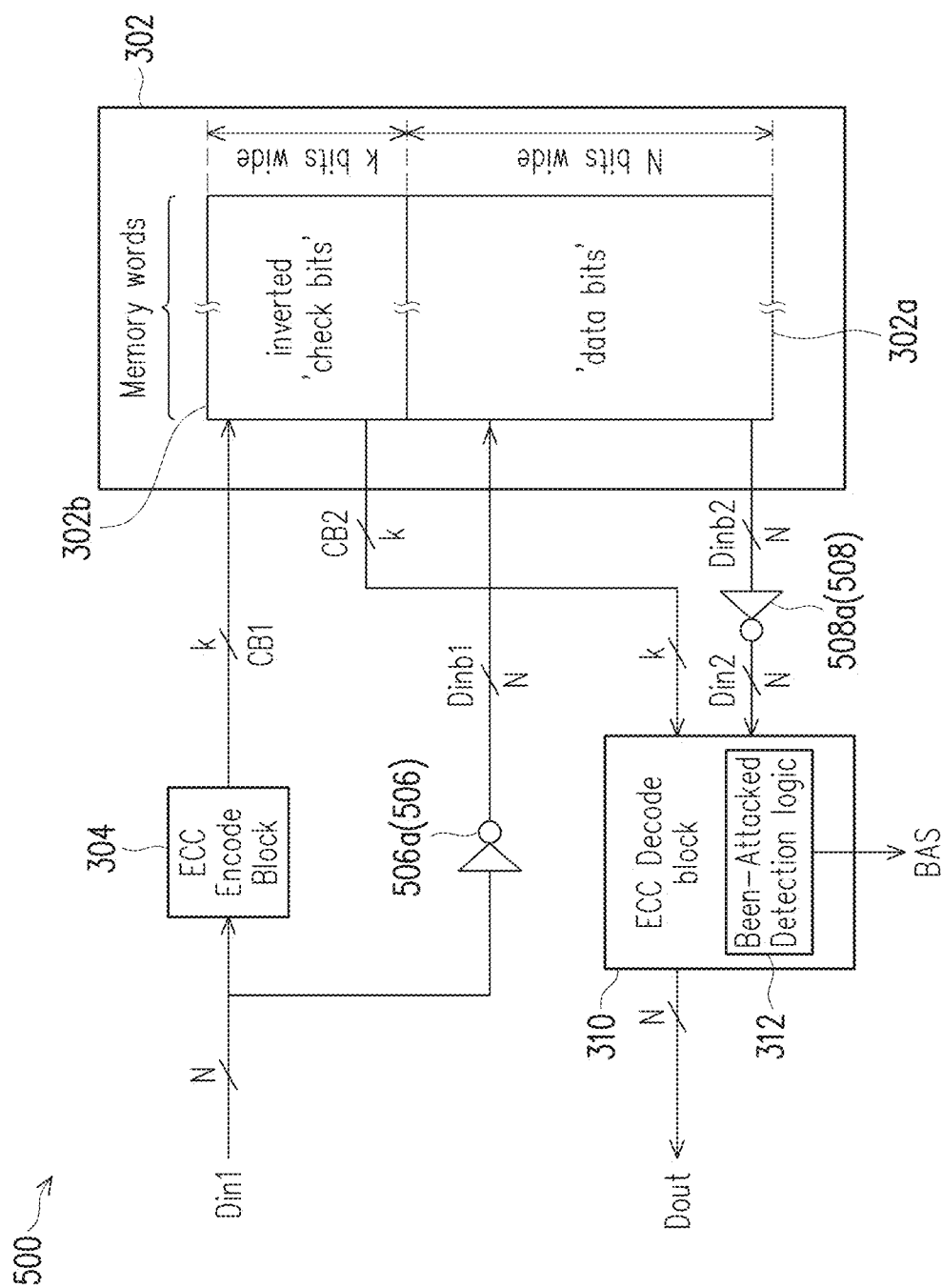
FIG. 5 is a block diagram of an integrated circuit useable in FIG. 1, in accordance with some embodiments.

FIG. 5 is a block diagram of an integrated circuit 500 usable in FIG. 1, in accordance with some embodiments.

Integrated circuit 500 is a variation of integrated circuit 300 of FIG. 3, and similar detailed description is omitted. In comparison with integrated circuit 300 of FIG. 3, integrated circuit 500 is configured to invert the set of data Din and not to invert the set of check bits CB1.

Integrated circuit 500 relates to integrated circuit 100 of FIG. 1. Integrated circuit 500 is an embodiment of integrated circuit 100, and similar detailed description is omitted.

Integrated circuit 500 includes memory cell array 302, ECC encoder 304, a set of inverters 506, a set of inverters 508 and ECC decoder 310. In some embodiments, ECC encoder 304, set of inverters 506, set of inverters 508 and ECC decoder 310 are an embodiment of ECC encoder/decoder 110 of FIG. 1, and similar detailed description is omitted.

In comparison with integrated circuit 300 of FIG. 3, set of inverters 506 replaces set of inverters 306, and set of inverters 508 replaces set of inverters 308, and similar detailed description is therefore omitted.

In comparison with integrated circuit 300 of FIG. 3, the output of ECC encoder 304 of FIG. 5 is coupled to the second portion of memory cells 302b, and the second portion of memory cells 302b is configured to store the set of check bits CB1, and similar detailed description is therefore omitted.

In comparison with integrated circuit 300 of FIG. 3, the second portion of the memory cells 302b of FIG. 5 is coupled to an input of ECC decoder 310, and the ECC decoder 310 is configured to receive the set of check bits CB2 from the second portion of memory cells 302b, and similar detailed description is therefore omitted.

In some embodiments, the set of check bits CB2 of FIG. 5 corresponds to the set of check bits CB1 stored in the second portion of memory cells 302b. In some embodiments, if the data stored in the second portion of memory cells 302b in FIG. 5 is not corrupted, then the set of check bits CB2 is equal to the set of check bits CB1. In some embodiments, if the data stored in the second portion of memory cells 302b in FIG. 5 is corrupted, then the set of check bits CB2 is not equal to the set of check bits CB1.

In comparison with integrated circuit 300 of FIG. 3, the set of inverters 506 is coupled to the first portion of memory cells 302a, and the first portion of memory cells 302a of FIG. 5 is configured to store the set of data Dinb1, and similar detailed description is therefore omitted.

The set of inverters 506 is configured to generate a set of data Dinb1 in response to the set of data Din1. Set of data Dinb1 includes at least data Dinb1a, Dinb1b, . . . , Dinb1m or Dinb1N. The set of data Dinb1 includes N bits. Each bit in the set of data Dinb1 is associated with each corresponding bit in the set of data Din1. Stated differently, at least bit Dinb1a, Dinb1b, . . . , Dinb1m or Dinb1N of the set of data Dinb1 corresponds to at least bit Din1a, Din1b, . . . , Din1m or Din1N of the set of data Din1.

In some embodiments, at least one bit of the set of data Dinb1 is inverted or complementary from at least one corresponding bit of the set of data Din1.

The set of inverters 506 includes at least inverter 506a, 506b, . . . , 506j or 506N. Each inverter of the set of inverters 506 is coupled in parallel to each other. Each inverter of the set of inverters 506 has a corresponding input terminal configured to receive bit Din1a, Din1b, . . . , Din1m or Din1N of the set of data Din1. Each inverter 506a, 506b, . . . , 506j or 506N of the set of inverters 506 has a corresponding output terminal coupled to a corresponding memory cell (not shown) in the first portion of memory cells 302a. Each inverter 506a, 506b, . . . , 506j or 506N of the set of inverters 506 has a corresponding output terminal configured to output at least corresponding bit Dinb1a, Dinb1b, . . . , Dinb1m or Dinb1N of the set of data Dinb1.

In some embodiments, a number of inverters in the set of inverters 506 is one or more. For example, in some embodiments, the set of inverters 506 includes M inverters (506a, . . . , 506M), and each inverter of the set of inverters 506 is configured to invert the bit of the set of data Din1, thereby generating the set of data Dinb1. In this embodiment, each bit of the set of data Dinb1 is inverted or complementary from each corresponding bit of the set of data Din1.

For example, in some embodiments, the set of inverters 506 includes 1 inverter 506a (e.g., inverter 506a), and inverter 506a of the set of inverters 506 is configured to invert the bit Din1a of the set of data Din1, thereby generating bit Dinb1a of the set of data Dinb1. In this embodiment, the set of data Dinb1 includes data Dinb1a, Dinb1b, . . . , Dinb1N. In this embodiment, bit Dinb1a is inverted or complementary from bit Din1a, and bit Dinb1b, . . . , Dinb1N are equal to corresponding bit Din1b, . . . , Din1N. Thus, in this embodiment, the set of data Dinb1 includes data Dinb1a, Din1b, . . . , Din1N, and bit Dinb1a is inverted or complementary from bit Din1a.

In comparison with integrated circuit 300 of FIG. 3, the set of inverters 508 is coupled between the first portion of memory cells 302a and the ECC decoder 310, the ECC decoder 310 of FIG. 5 is configured to receive the set of data Din2, and similar detailed description is therefore omitted.

The set of inverters 508 is configured to receive a set of data Dinb2, and is configured to generate a set of data Din2 in response to the set of data Dinb2.

Set of data Dinb2 includes at least data Dinb2a, Dinb2b, . . . , Dinb2m or Dinb2N. The set of data Dinb2 includes N bits.

Set of data Din2 includes at least data Din2a, Din2b, . . . , Din2m or Din2N. The set of data Din2 includes N bits.

Each bit in the set of data Dinb2 is associated with each corresponding bit in the set of data Dinb1 or each corresponding bit in the set of data Din2. Stated differently, at least bit Dinb2a, Dinb2b, . . . , Dinb2m or Dinb2N of the set of data Dinb2 corresponds to at least bit Dinb1a, Dinb1b, . . . , Dinb1m or Dinb1N of the set of data Dinb1 or at least bit Din2a, Din2b, . . . , Din2m or Din2N of the set of data Din2.

In some embodiments, the set of data Dinb2 corresponds to the set of data Dinb1 stored in the first portion of memory cells 302a. In some embodiments, if the data stored in the first portion of memory cells 302a is not corrupted, then the set of data Dinb2 is equal to the set of data Dinb1. In some embodiments, if the data stored in the first portion of memory cells 302a is corrupted, then the set of data Dinb2 is not equal to the set of data Dinb1.

In some embodiments, at least one bit of the set of data Dinb2 is inverted or complementary from at least one corresponding bit of the set of data Din2.

The set of inverters 508 includes at least inverter 508a, 508b, . . . , 508m or 508N. Each inverter of the set of inverters 508 is coupled in parallel to each other. Each inverter of the set of inverters 508 has a corresponding input terminal coupled to a corresponding memory cell (not shown) of the first portion of memory cells 302a. Each inverter of the set of inverters 508 has a corresponding output terminal coupled to an input terminal of EC decoder 312.

A number of inverters in the set of inverters 508 is equal to a number of inverters in the set of inverters 506. For example, in some embodiments, the set of inverters 506 includes N inverters (506a, . . . , 506N), so the set of inverters 508 includes N inverters (508a, . . . , 508N), and each inverter of the set of inverters 508 is configured to invert the corresponding bit of the set of data Dinb2, thereby generating set of data Din2. In this embodiment, each bit of the set of data Din2 is inverted or complementary from each corresponding bit of the set of data Dinb2.

Each inverter of the set of inverters 506 corresponds with each inverter of the set of inverters 508. Thus, each bit of the set of data Dinb1 that is inverted by a corresponding inverter in the set of inverters 506 is in a corresponding path that also includes a corresponding inverter of the set of inverters 508, and data bits in paths that do not include an inverter from the set of inverters 506, also do not include an inverter from the set of inverters 508. For example, in some embodiments, the set of inverters 506 includes 1 inverter (e.g., inverter 506a) configured to invert bit Din1a thereby generating bit Dinb1a of the set of data Dinb1, and therefore the set of inverters 508 includes 1 inverter (e.g., inverter 508a), and inverter 508a of the set of inverters 508 is configured to invert bit Dinb2a of the set of data Dinb2, thereby generating bit Din2a of the set of data Din2. In this embodiment, the set of data Din2 includes data Din2a, Din2b, Din2c, . . . , Din2N. In this embodiment, bit Din2a is inverted or complementary from bit Dinb2a, and data Din2b, Din2c, . . . , Din2N are equal to corresponding data Dinb2b, Dinb2c, . . . , Dinb2N. Thus, in this embodiment, the set of data Din2 includes data Din2a, Dinb2b, Dinb2c, . . . , Dinb2N, and bit Din2a is inverted or complementary from bit Dinb2a.

Other configurations of integrated circuit 500 are within the scope of the present disclosure.

Integrated circuit 500 achieves the benefits discussed above with respect to integrated circuit 100 of FIG. 1.

Logic Gate

Figure 6:
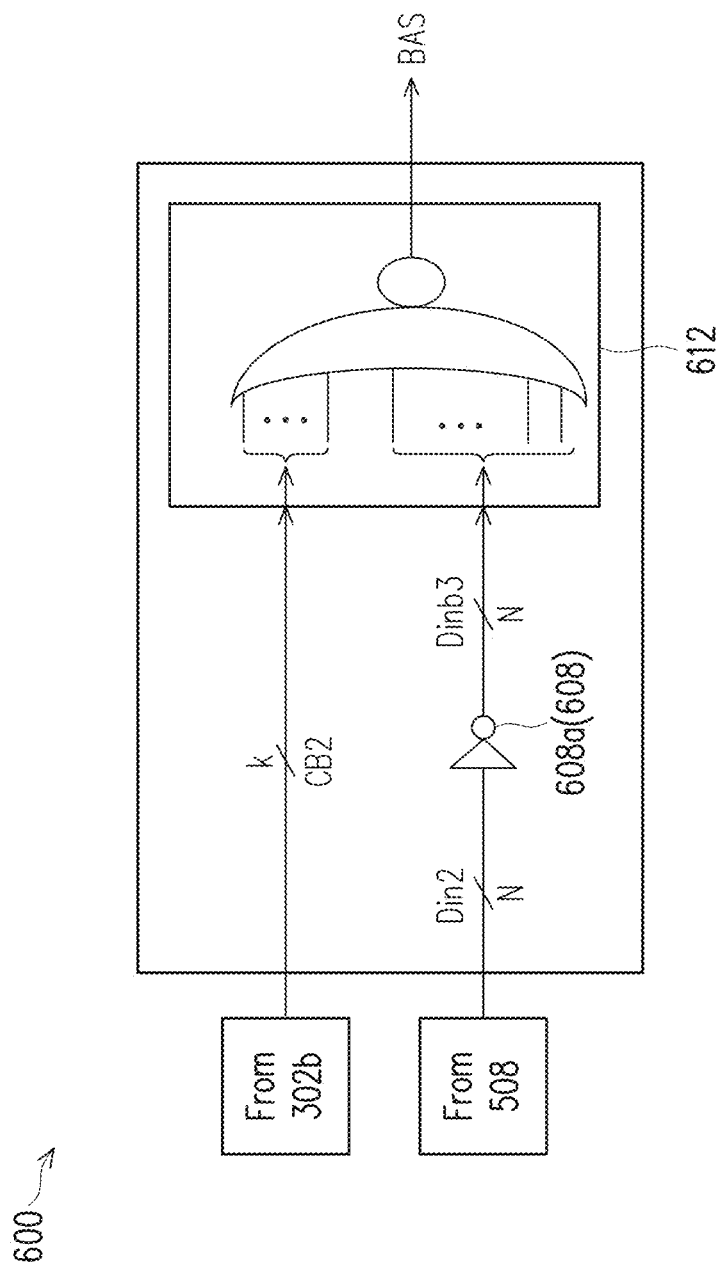
FIG. 6 is a block diagram of a logic gate, in accordance with some embodiments.

FIG. 6 is a block diagram of a logic gate 600, in accordance with some embodiments.

Logic gate 600 is an embodiment of the been-attacked logic gate 312 of FIG. 5, and similar detailed description is omitted. Logic gate 600 is a variation of logic gate 400 of FIG. 4, and similar detailed description is omitted. In comparison with logic gate 400 of FIG. 4, logic gate 600 is configured to invert the set of data Din2 and not to invert the set of check bits CB2.

Logic gate 600 includes a set of inverters 608 and a NOR logic gate 612.

In comparison with logic gate 400 of FIG. 4, set of inverters 608 replaces set of inverters 408, and NOR logic gate 612 replaces NOR logic gate 412, and similar detailed description is therefore omitted.

The set of inverters 608 is coupled between the set of inverters 508 and the NOR logic gate 612. The NOR logic gate 612 is coupled to the set of inverters 508 and the first portion of memory cells 302a.

In comparison with logic gate 400 of FIG. 4, the output terminals of the set of inverters 508 of FIG. 5 are coupled to corresponding input terminals of the set of inverters 608, and corresponding output terminals of the set of inverters 608 are coupled to corresponding input terminals of the NOR logic gate 612, and similar detailed description is therefore omitted.

In comparison with logic gate 400 of FIG. 4, input terminals of NOR logic gate 612 are coupled to corresponding memory cells (not shown) of the first portion of memory cells 302a and corresponding output terminals of the set of inverters 608, and similar detailed description is therefore omitted.

The set of inverters 608 is configured to receive the set of data Din2, and is configured to generate a set of data Dinb3 in response to the set of data Din2.

Set of data Dinb3 includes at least data Dinb3a, Dinb3b, . . . , Dinb3m or Dinb3N. The set of data Dinb3 includes N bits.

In some embodiments, the set of data Dinb3 corresponds to the set of data Din2. Each bit in the set of data Dinb3 is associated with each corresponding bit in the set of data Din2. Stated differently, at least bit Dinb3a, Dinb3b, . . . , Dinb3m or Dinb3N of the set of data Dinb3 corresponds to at least bit Din2a, Din2b, . . . , Din2m or Din2N of the set of data Din2.

In some embodiments, at least one bit of the set of data Dinb3 is inverted or complementary from at least one corresponding bit of the set of data Din2.

The set of inverters 608 includes at least inverter 608a, 608b, . . . , 608m or 608N. Each inverter of the set of inverters 608 is coupled in parallel to each other. Each inverter of the set of inverters 608 has a corresponding input terminal coupled to the corresponding output terminal of the set of inverters 508. Each inverter of the set of inverters 608 has a corresponding output terminal coupled to a corresponding terminal of NOR logic gate 612.

Each inverter of the set of inverters 506 and 508 corresponds with each inverter of the set of inverters 608. A number of inverters in the set of inverters 608 is equal to a number of inverters in the set of inverters 506 and 508, similar to the way the number of inverters in the set of inverters 408 is equal to a number of inverters in the set of inverters 406 and 408, and similar detailed description is therefore omitted.

In some embodiments, if the set of inverters 608 includes M inverters (608a, . . . , 608M), then each inverter of the set of inverters 608 is configured to invert the corresponding bit of the set of data Din2, and each bit of the set of data Dinb3 is inverted or complementary from each corresponding bit of the set of data Din2.

In some embodiments, if the set of inverters 608 includes 1 inverter (e.g., inverter 608a), then inverter 608a of the set of inverters 608 is configured to invert bit Din2a of the set of data Din2, thereby generating bit Dinb3a of the set of data Dinb3. In this embodiment, the output terminal of inverter 608a of the set of inverters 608 is coupled to an input terminal of the NOR logic gate 612, and the other input terminals of the NOR logic gate 612 are coupled to the first portion of memory cells 302a and the output terminals of inverters 508b, . . . , 508N of the set of inverters 508. In this embodiment, bit Dinb3a is inverted or complementary from bit Din2a, and bits Dinb3b, . . . , Dinb3N are equal to corresponding data Din2b, . . . , Din2N.

Other configurations or types of logic gates for NOR logic gate 612 are within the scope of the present disclosure.

In some embodiments, a non-limiting example of operation of integrated circuit 500 and logic gate 600 are similar to operation of integrated circuit 300 and logic gate 400, and similar detailed description is therefore omitted.

Other values or number of bits for the been-attacked signal BAS are within the scope of the present disclosure. For example, in some embodiments, a value of logic 0 for the been-attacked signal BAS indicates that an attack was detected or occurred, and a value of logic 1 for the been-attacked signal BAS indicates that an attack was not detected or did not occur.

Other configurations of logic gate 600 are within the scope of the present disclosure. In some embodiments, the set of inverters 506, 508 and 608 are replaced by other logic circuits performing the same logic function.

Logic gate 600 achieves the benefits discussed above with respect to integrated circuit 100 of FIG. 1.

Parity Check Matrix

Figure 7:
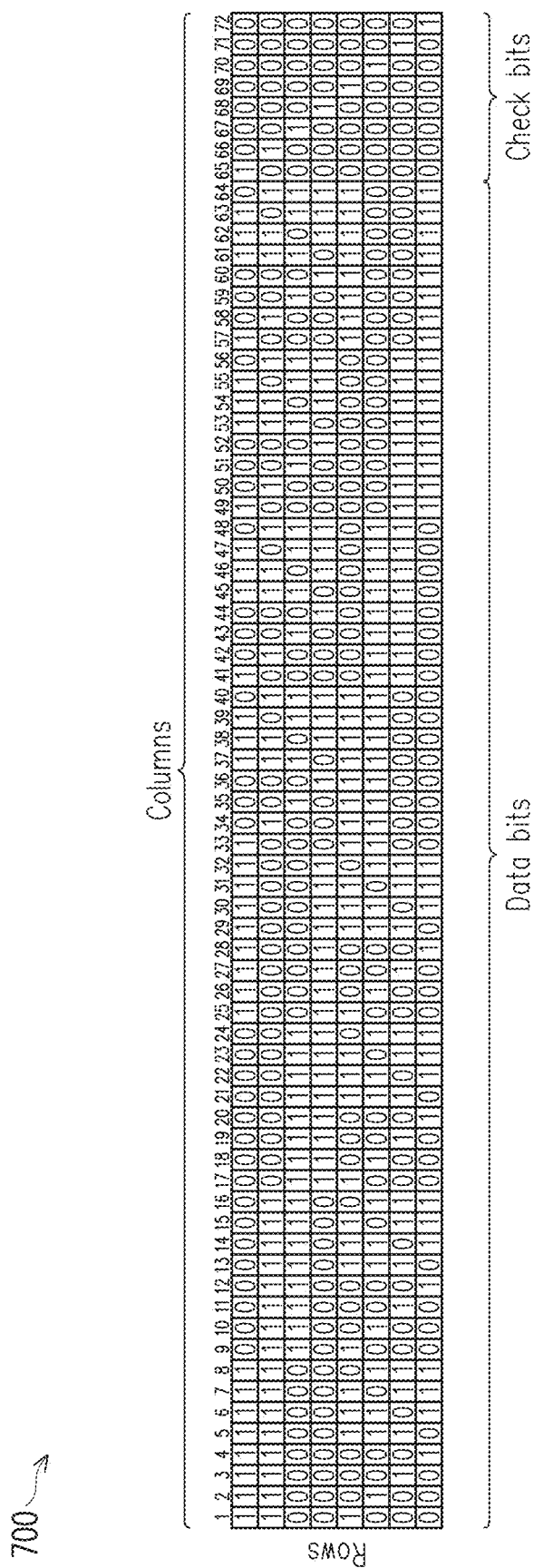
FIG. 7 is a table of a parity check matrix, in accordance with some embodiments.

FIG. 7 is a table 700 of a parity check matrix H, in accordance with some embodiments.

Table 700 and parity check matrix H is useable by ECC encoder 304 and ECC decoder 312. For example, in some embodiments, ECC encoder 304 is configured to use parity check matrix H to generate the set of check bits CB1. For example, in some embodiments, ECC decoder 312 is configured to use parity check matrix H to decode the set of check bits CB2. In some embodiments, table 700 is usable to correct at least 1 error bit in the set of output data Dout of FIGS. 3 and 5. Other parity check matrices are within the scope of the present disclosure.

Table 700 is a non-limiting example of a parity check matrix H of a BCH(72, 64, 1) code that is capable of correcting errors in the set of output signals Dout. Table 700 includes 8 rows arranged in the first direction X, and 72 columns arranged in the second direction Y. In some embodiments, the number of rows corresponds to the number of check bits in the set of check bits CB1, CBB1, CBB2, CB2 and CBB3. In some embodiments, the number of columns corresponds to a sum of the number of check bits in the set of check bits CB1, CBB1, CBB2, CB2 and CBB3 and the number of bits of data in the set of data Din1, Dinb1, Dinb2, Din2 and Dinb3. In some embodiments, columns 1-64 correspond to data bits and columns 65-72 correspond to check bits of the parity check matrix H.

Other ECC's useable to generate different parity check matrices are within the scope of the present disclosure.

XOR Trees

Figure 8:
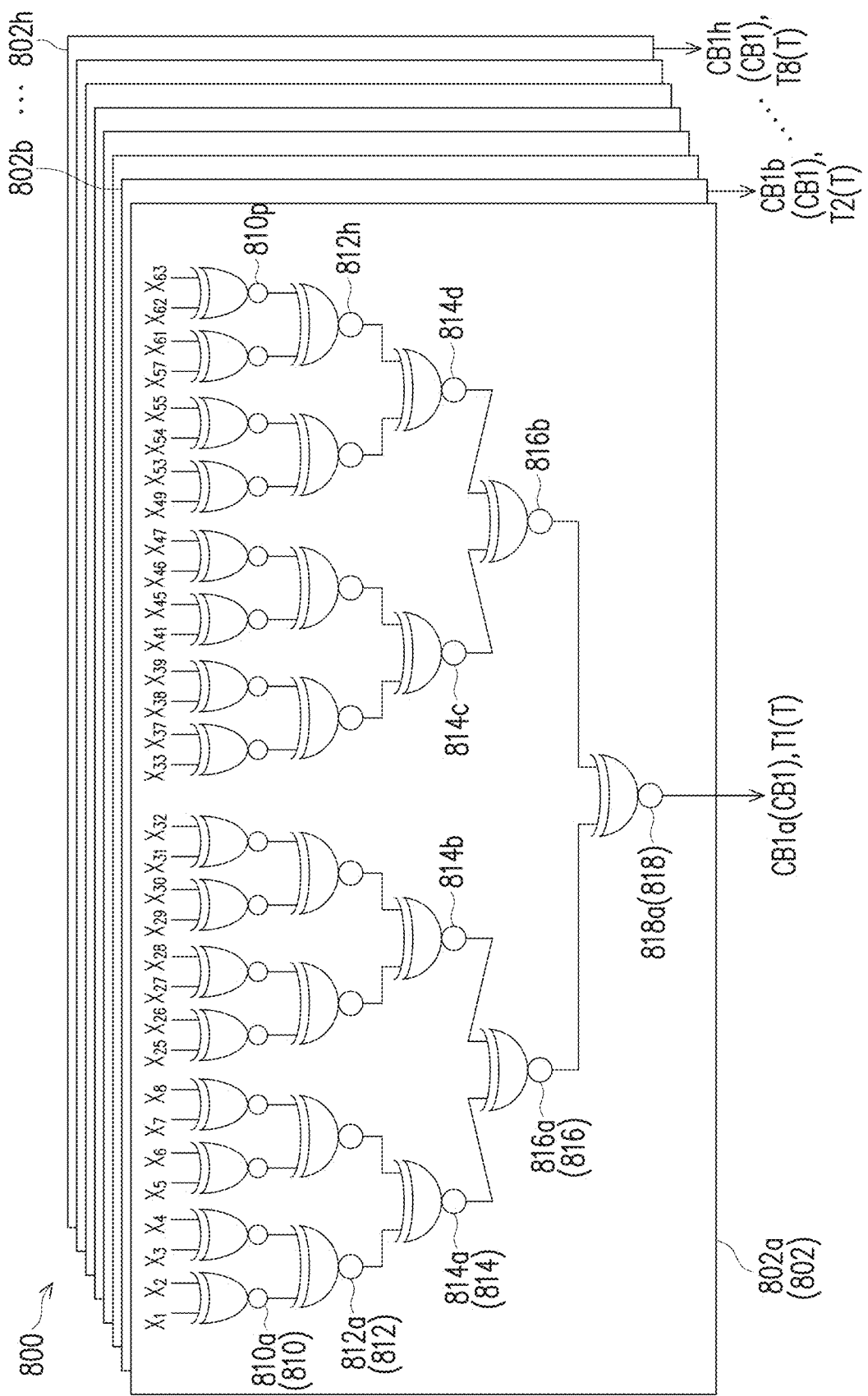
FIG. 8 is a block diagram of exclusive OR (XOR) trees, in accordance with some embodiments.

FIG. 8 is a block diagram of XOR trees 800, in accordance with some embodiments.

In some embodiments, XOR trees 800 are an embodiment of ECC encoder 304 of FIGS. 3 and 5, and similar detailed description is omitted.

Figure 9:
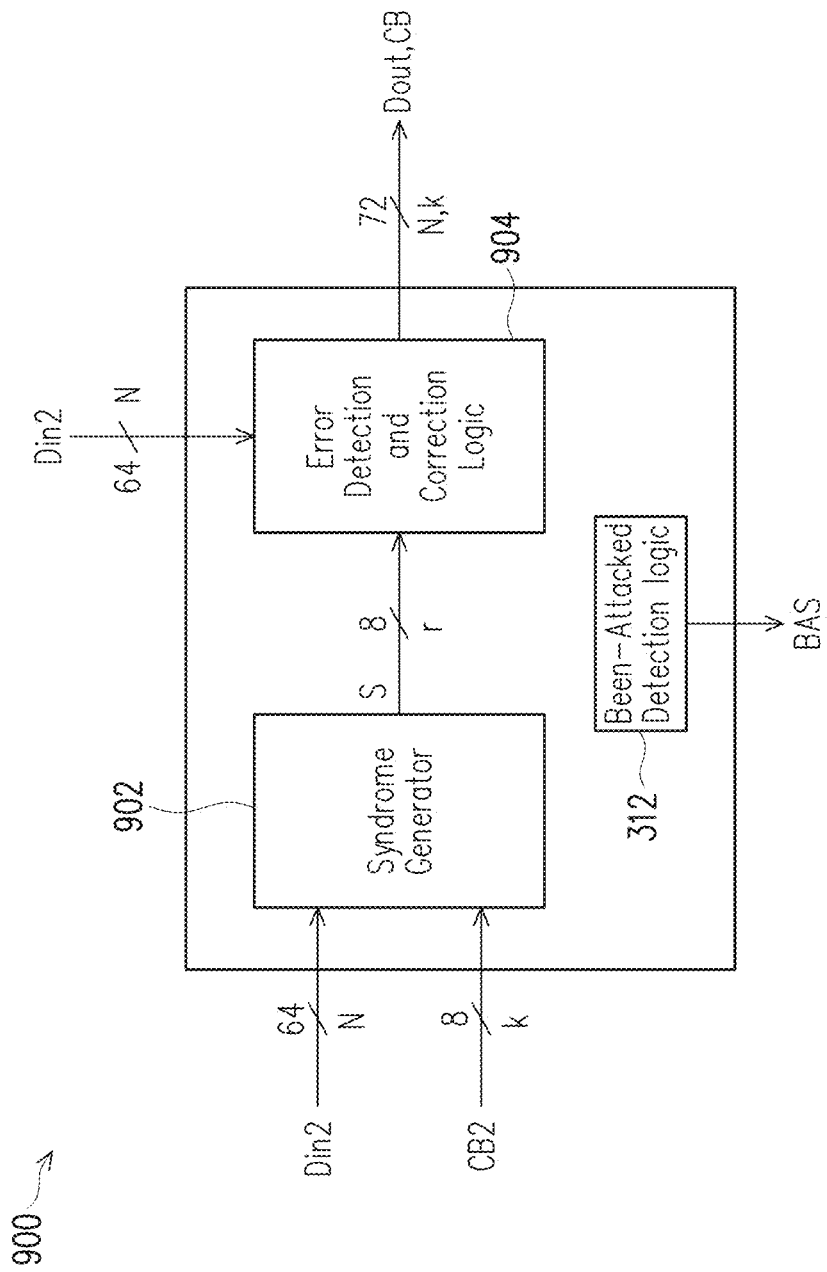
FIG. 9 is a block diagram of an ECC decoder, in accordance with some embodiments.
Figure 10:
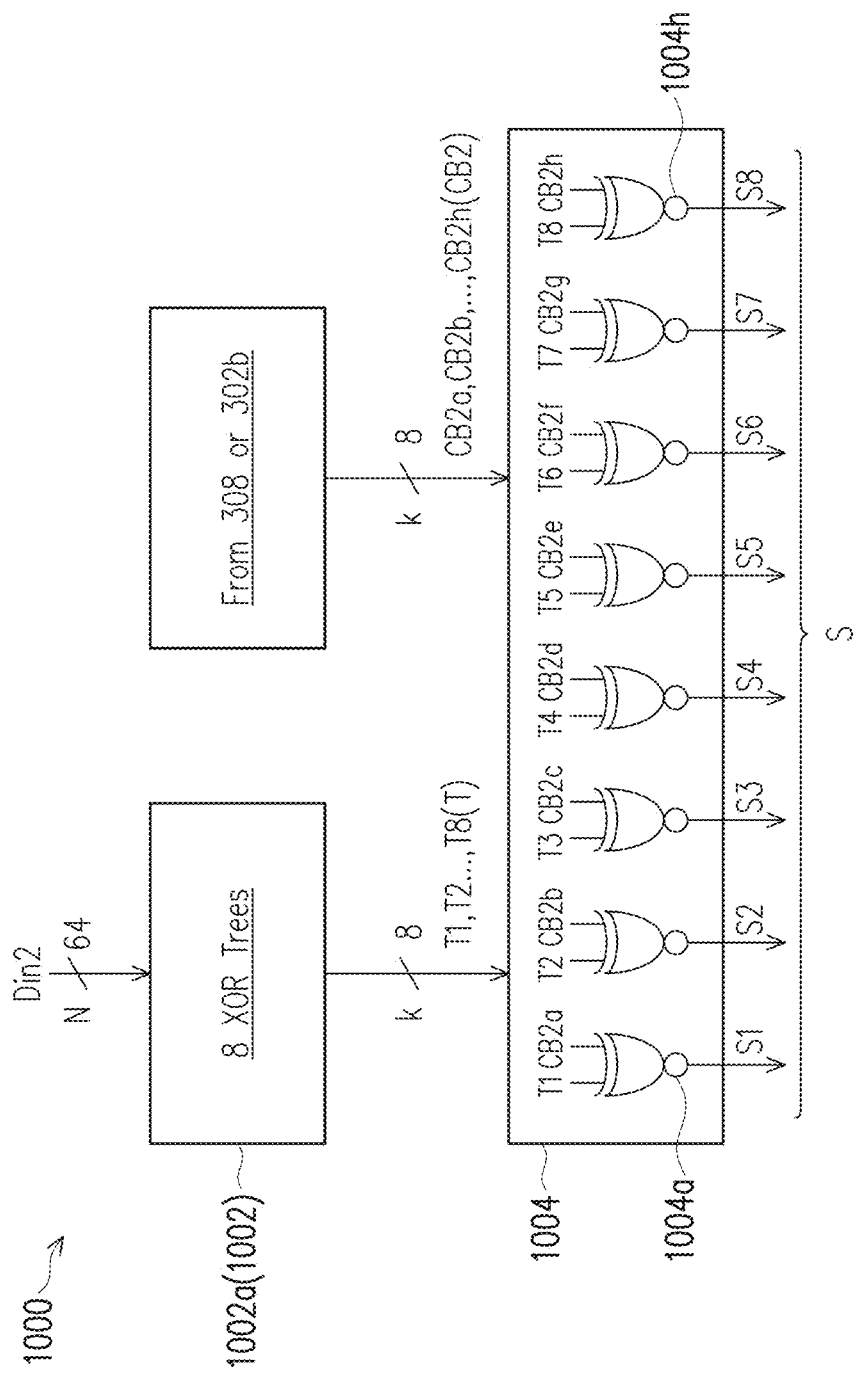
FIG. 10 is a block diagram of a syndrome generator, in accordance with some embodiments.

In some embodiments, XOR trees 800 are useable in an ECC decoder as a syndrome generator, such as syndrome generator 902 in FIG. 9 or as XOR trees 1002 of FIG. 10, and similar detailed description is omitted.

XOR trees 800 include XOR trees 802a, 802b, 802c, . . . , 802h (collectively referred to as a "set of XOR trees 802"). Other numbers of trees are within the scope of the present disclosure. For example, in some embodiments, the number of XOR trees 800 corresponds to the number k of check bits generated by ECC encoder 304 or useable by syndrome generator 1000 in FIG. 10.

In some embodiments, XOR trees 800 are an embodiment of ECC encoder 304 of FIGS. 3 and 5, and each XOR tree 802a, 802b, 802c, . . . , 802h in the set of XOR trees 802 is configured to generate a corresponding check bit CB1a, CB1b, CB1c, . . . , CB1h of the set of check bits CB of FIGS. 3 and 5. In these embodiments, XOR tree 802a is configured to receive a portion of the set of data Din1, and is configured to generate check bit CB1a of the set of check bits CB1.

In some embodiments, XOR trees 800 are an embodiment of XOR trees 1002 of FIG. 10, and each XOR tree 802a, 802b, 802c, . . . , 802h in the set of XOR trees 802 is configured to generate a corresponding check bit T1a, T1b, T1c, . . . , Th of the set of check bits T. In some embodiments, the corresponding check bit T1a, T1b, T1c, . . . , Th of the set of check bits T are useable by syndrome generator 1000 in FIG. 10. In these embodiments, XOR tree 802a is configured to receive a portion of the set of data Din2, and is configured to generate check bit T1a of the set of check bits T.

XOR trees 800 have input terminals x1, . . . , x64. Each input terminal x1-x64 is configured to receive a corresponding bit of the set of data Din1 or Din2. For example, input terminal x1 is configured to receive a bit in position 1 of the set of data Din1 or Din2, input terminal x2 is configured to receive a bit in position 2 of the set of data Din1 or Din2, and so forth.

In some embodiments, the configuration of XOR trees 800 is based on the rows and columns in the parity check matrix 700. Each XOR tree of the set of XOR trees 802 is constructed from a row in table 700. In some embodiments, XOR tree 802a, 802b, . . . , 802h of the set of XOR trees 802 is constructed from corresponding row 1, 2, . . . , 8 of table 700. Stated differently, each XOR tree of the set of XOR trees 802 includes a portion of the input terminals x1, . . . , x64 based on a row in table 700. For each row, in table 700, when a "1" is present in a column, then the corresponding column number is a corresponding input terminal of input terminals x1, . . . , x64. For example, in row 1 of table 700, columns 1-8, 25-33, 37, 38, 39, 41, 45, 46, 47, 49, 53, 54, 55, 57, 61, 62 and 63 have entries of "1", and therefore XOR tree 802a has corresponding input terminals x1, . . . , x8, x25, . . . , x33, x37, x38, x39, x41, x45, x46, x47, x49, x53, x54, x55, x57, x61, x62 and x63. In row 2 of table 700, columns 1-16, 34, 37, 38, 40, 42, 45, 46, 48, 50, 53, 54, 56, 58, 61, 62 and 64 have entries of "1", and therefore XOR tree 802b has corresponding input terminals x1-x16, x34, x37, x38, x40, x42, x45, x46, x48, x50, x53, x54, x56, x58, x61, x62 and x64 (not shown). The input terminals for XOR trees 802c-802h follow a similar approach as the input terminals for XOR trees 802c-802h, and are not described for brevity.

XOR tree 802a includes set of XOR gates 810, 812, 814, 816 and 818. In some embodiments, XOR tree 802a includes other numbers of sets of XOR gates 810, 812, 814, 816 and 818.

The set of XOR gates 810 have input terminals x1, . . . , x8, x25, . . . , x33, x37, x38, x39, x41, x45, x46, x47, x49, x53, x54, x55, x57, x61, x62 and x63. In some embodiments, input terminals x1, . . . , x8, x25, . . . , x33, x37, x38, x39, x41, x45, x46, x47, x49, x53, x54, x55, x57, x61, x62 and x63 are configured to receive bits at corresponding bit positions 1-8, 25-33, 37, 38, 39, 41, 45, 46, 47, 49, 53, 54, 55, 57, 61, 62 and 63 of the set of data Din or Din2.

The set of XOR gates 810 includes at least XOR gate 810a, 810b, . . . , 810o or 810p.

XOR gate 810a has input terminals x1 and x2, XOR gate 810b has input terminals x3 and x4, XOR gate 810c has input terminals x5 and x6, XOR gate 810d has input terminals x7 and x8, XOR gate 810e has input terminals x25 and x26, XOR gate 810f has input terminals x27 and x28, XOR gate 810g has input terminals x29 and x30, XOR gate 810h has input terminals x31 and x32, XOR gate 810i has input terminals x33 and x37, XOR gate 810*j* has input terminals x38 and x39, XOR gate 810*k* has input terminals x41 and x45, XOR gate 810*l* has input terminals x46 and x47, XOR gate 810*m* has input terminals x49 and x53, XOR gate 810*n* has input terminals x54 and x55, XOR gate 810*o* has input terminals x57 and x61, and XOR gate 810*p* has input terminals x62 and x63.

A pair of XOR gates of the set of XOR gates 810 is coupled to an XOR gate of the set of XOR gates 812. For example, XOR gates 810*a* and 810*b* are coupled to XOR gate 812*a* of the set of XOR gates 812.

The set of XOR gates 812 includes at least XOR gate 812*a*, 812*b*, . . . , 812*g* or 812*h*. A pair of XOR gates of the set of XOR gates 812 is coupled to an XOR gate of the set of XOR gates 814. For example, XOR gates 812*a* and 812*b* are coupled to XOR gate 814*a* of the set of XOR gates 814.

The set of XOR gates 814 includes at least XOR gate 814*a*, 814*b*, 814*c* or 814*d*. A pair of XOR gates of the set of XOR gates 814 is coupled to an XOR gate of the set of XOR gates 816. For example, XOR gates 814*a* and 814*b* are coupled to XOR gate 816*a* of the set of XOR gates 816.

The set of XOR gates 816 includes at least XOR gate 816*a* or 816*b*. The set of XOR gates 818 includes at least XOR gate 818*a*. A pair of XOR gates of the set of XOR gates 816 is coupled to an XOR gate of the set of XOR gates 818. For example, XOR gates 816*a* and 816*b* are coupled to XOR gate 818*a* of the set of XOR gates 818.

In some embodiments, XOR gate 818*a* is configured to output check bit CB1*a* of the set of check bits CB1. In some embodiments, XOR gate 818*a* is configured to output check bit T1*a* of the set of check bits T.

Other numbers of XOR gates in one or more of the set of XOR gates 810, 812, 814, 816 and 818 are within the scope of the present disclosure.

For ease of illustration, the details of XOR trees 802*b*, 802*c*, . . . , 802*h* are not shown, but are similar to the details of XOR tree 802*a*, and similar detailed description is thus omitted.

Other configurations of XOR trees 800 are within the scope of the present disclosure.

ECC Decoder

FIG. 9 is a block diagram of an ECC decoder 900, in accordance with some embodiments.

ECC decoder 900 is an embodiment of ECC decoder 312 of FIGS. 3 and 5, and similar detailed description is omitted.

ECC decoder 900 includes a syndrome generator 902, an error and detection logic 904 and been-attacked logic gate 312.

Syndrome generator 902 is configured to receive to the set of data Din2 and the set of check bits CB2. Syndrome generator 902 is configured to generate a syndrome vector (hereinafter referred to as "syndrome") S in response to the set of data Din2 and the set of check bits CB2. The output terminals of syndrome generator 902 are coupled to corresponding input terminals of error and detection logic 904.

The syndrome S includes S1, S2, . . . , S8. The syndrome S has r bits. In some embodiments, r bits is less than N bits. In some embodiments, r bits is equal to k N bits.

The syndrome S indicates a location of an error in the set of data Din2 and the set of check bits CB2 (e.g., the codeword). For example, in some embodiments, a syndrome of all 0's indicates that no error is present in the set of data Din2 and the set of check bits CB2 (e.g., the codeword). For example, in some embodiments, a syndrome including a 1 indicates that an error is present in the set of data Din2 and the set of check bits CB2 (e.g., the codeword).

In some embodiments, syndrome generator 902 is coupled to the set of inverters 508 and the second portion of memory cells 302*b*. In some embodiments, syndrome generator 902 is configured to receive the set of data Din2 from the set of inverters 508, and the set of check bits CB2 from the second portion of memory cells 302*b*.

In some embodiments, syndrome generator 902 is coupled to the set of inverters 308 and the first portion of memory cells 302*a*. In some embodiments, syndrome generator 902 is configured to receive the set of data Din2 from the set of inverters 308, and the set of check bits CB2 from the first portion of memory cells 302*a*. Other configurations of syndrome generator 902 are within the scope of the present disclosure.

Error detection and correction logic 904 is configured to generate the set of output data in response to the set of data Din2 and the syndrome S. In some embodiments, error detection and correction logic 904 is coupled to the syndrome generator 902 and the first portion of memory cells 302*a*, and is configured to receive the syndrome S from the syndrome generator 902, and the set of data Din2 from the first portion of memory cells 302*a*. In some embodiments, error detection and correction logic 904 is coupled to the syndrome generator 902 and the set of inverters 508, and is configured to receive the syndrome S from the syndrome generator 902, and the set of data Din2 from at least the set of inverters 508. Other configurations of error detection and correction logic 904 are within the scope of the present disclosure.

Other configurations of ECC decoder 900 are within the scope of the present disclosure.

ECC decoder 900 achieves the benefits discussed above with respect to integrated circuit 100 of FIG. 1.

Syndrome Generator

FIG. 10 is a block diagram of a syndrome generator 1000, in accordance with some embodiments.

Syndrome generator 1000 is an embodiment of syndrome generator 902 of FIG. 9, and similar detailed description is omitted.

Syndrome generator 1000 includes a set of XOR trees 1002 and a set of XOR logic gates 1004.

The set of XOR trees 1002 include at least XOR tree 1002*a*, 1002*b*, . . . , 1002*g* or 1002*h*. XOR trees 800 of FIG. 8 is useable as the set of XOR trees 1002, and similar detailed description is omitted. Other numbers of trees are within the scope of the present disclosure. For example, in some embodiments, the number of XOR trees in the set of XOR trees 1002 corresponds to the number k of check bits generated by ECC encoder 304 or useable by syndrome generator 1000.

The set of XOR trees 1002 is configured to receive the set of data Din2. In some embodiments, the set of XOR trees 1002 is coupled to the set of inverters 508. In some embodiments, the set of XOR trees 1002 is coupled to the first portion of memory cells 302*a*.

The set of XOR trees 1002 is configured to generate the set of check bits T in response to the set of data Din2. The set of check bits T includes at least check bit T1*a*, T1*b*, T1*c*, . . . , Tg or Th. Each XOR tree 1002*a*, 1002*b*, . . . , 1002*h* of the set of XOR trees 1002 is configured to generate a corresponding check bit T1*a*, T1*b*, . . . , Th of the set of check bits T in response to the set of data Din2.

The set of XOR logic gates 1004 is configured to generate the syndrome S in response to the set of check bits T and the set of check bits CB2. In some embodiments, the set of XOR logic gates 1004 generate the syndrome S based on a comparison of each bit of the set of check bits T and each corresponding bit the set of check bits CB2. For example, the same logic inputs to an XOR logic gate of the set of XOR logic gates 1004 results in a logic "0" output, and different logic inputs to an XOR logic gate of the set of XOR logic gates 1004 results in a logic "1" output.

The set of XOR logic gates 1004 include at least XOR logic gate 1004a, 1004b, . . . , 1004g or 1004h. XOR trees 800 of FIG. 8 is useable as the set of XOR trees 1002, and similar detailed description is omitted. Other numbers of XOR logic gates are within the scope of the present disclosure. For example, in some embodiments, the number of XOR logic gates in the set of XOR logic gates 1004 corresponds to the number k of check bits generated by ECC encoder 304 or useable by syndrome generator 1000.

In some embodiments, the set of XOR logic gates 1004 is coupled to the set of XOR trees 1002 and the set of inverters 308. In some embodiments, each XOR logic gate 1004a, 1004b, . . . , 1004h of the set of XOR logic gates 1004 is coupled to a corresponding XOR tree 1002a, 1002b, . . . , 1002h of the set of XOR trees 1002 and a corresponding inverter 308a, 308b, . . . , 308h of the set of inverters 308, and is configured to generate a corresponding syndrome bit S1, S2, . . . , S8 of the syndrome S.

In some embodiments, the set of XOR logic gates 1004 is coupled to the set of XOR trees 1002 and the second portion 302b of the memory cells. In some embodiments, each XOR logic gate 1004a, 1004b, . . . , 1004h of the set of XOR logic gates 1004 is coupled to a corresponding XOR tree 1002a, 1002b, . . . , 1002h of the set of XOR trees 1002 and a corresponding memory cell (not shown) of the second portion of memory cells, and is configured to generate a corresponding syndrome bit S1, S2, . . . , S8 of the syndrome S. Other configurations of at least the set of XOR trees 1002 or the set of XOR logic gates 1004 are within the scope of the present disclosure.

Other configurations of syndrome generator 1000 are within the scope of the present disclosure. Syndrome generator 1000 achieves the benefits discussed above with respect to integrated circuit 100 of FIG. 1.

Error Logic Circuit

Figure 11:
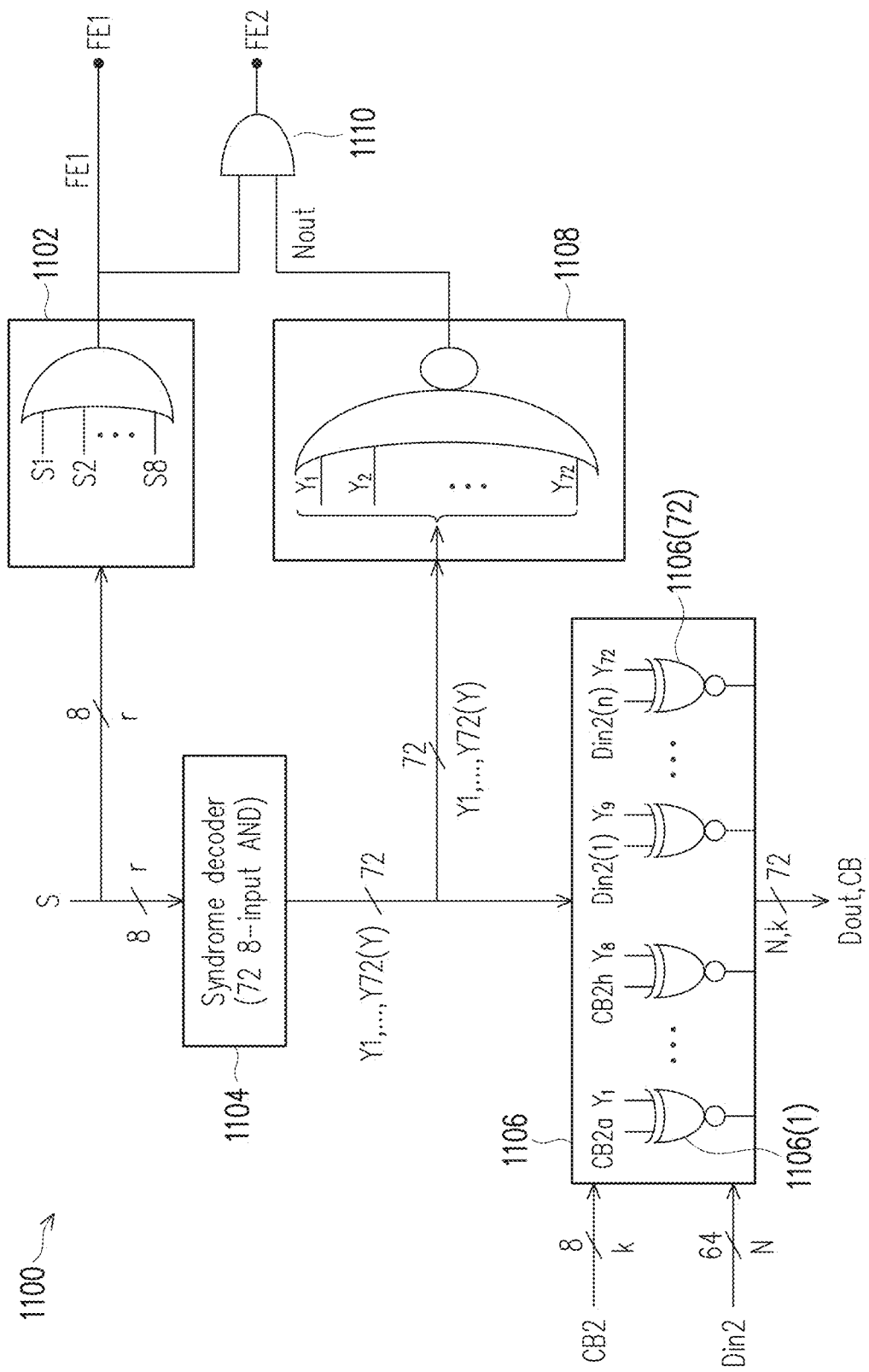
FIG. 11 is a block diagram of an error logic circuit, in accordance with some embodiments.

FIG. 11 is a block diagram of an error logic circuit 1100, in accordance with some embodiments.

Error logic circuit 1100 is an embodiment of error detection and correction logic 904 of FIG. 9, and similar detailed description is omitted.

Error logic circuit 1100 includes an OR logic gate 1102, a syndrome decoder 1104, a set of XOR logic gates 1106, a NOR logic gate 1108, and an AND logic gate 1110.

The OR logic gate 1102 is coupled to the syndrome generator 902 of FIG. 9 or syndrome generator 1000 of FIG. 10. The OR logic gate 1102 has r input terminals configured to receive a corresponding syndrome bit of syndrome S.

The OR logic gate 1102 is configured to generate an error detected signal FE1 in response to the syndrome S. In some embodiments, the error detected signal FE1 indicates whether an error in the set of check bits CB2 and the set of data Din2 is detected. For example, in some embodiments, the error detected signal FE1 has a value of logic 0 when there is no error in the set of check bits CB2 and the set of data Din2 (e.g., codeword). For example, in some embodiments, the error detected signal FE1 has a value of logic 1 when there is an error in the set of check bits CB2 and the set of data Din2 (e.g., codeword). Other values of error detected signal FE1 are within the scope of the present disclosure.

Other configurations or logic circuit types for OR logic gate 1102 are within the scope of the present disclosure.

The syndrome decoder 1104 is coupled to the syndrome generator 902 of FIG. 9 or syndrome generator 1000 of FIG. 10. The syndrome decoder 1104 is configured to generate an error signal Y in response to the syndrome S. In some embodiments, the error signal Y identifies at least a location of the error in the set of check bits CB2 and the set of data Din2. In some embodiments, the syndrome decoder is a 8-by-72 decoder. In some embodiments, the syndrome decoder is a 8-by-72 decoder including 72 8-input AND logic gates.

The error signal Y includes error signals Y1, Y2, . . . , Y72. Each error signal Y1, Y2, . . . , Y72 of error signals Y corresponds to check bits of the set of check bits CB2 and bits of the set of data Din2. In some embodiments, error signal Y is an error locator polynomial that identifies error positions in the set of check bits CB2 and the set of data Din2.

The set of XOR logic gates 1106 is configured to generate the set of output data Dout in response to the error signal Y, the set of data Din2 and the set of check bits CB2.

In some embodiments, the set of XOR logic gates 1106 is configured to generate the set of output data Dout based on a comparison of each bit in the error signal Y and each corresponding check bit in the set of check bits CB2 and each corresponding bit in the set of data Din2. For example, the same logic inputs to an XOR logic gate of the set of XOR logic gates 1106 results in a logic "0" output, and different logic inputs to an XOR logic gate of the set of XOR logic gates 1106 results in a logic "1" output. In other words, the set of XOR logic gates 1106 is configured to correct an erroneous bit by flipping the logic value of the bit.

The set of XOR logic gates 1106 include at least XOR logic gate 1106(1), 1106(2), . . . , 1106(71) or 1106(72). Other numbers of XOR logic gates are within the scope of the present disclosure. For example, in some embodiments, the number of XOR logic gates in the set of XOR logic gates 1106 corresponds to the sum of the number k of check bits generated by ECC encoder 304 and the number of bits of data of the set of data Din.

In some embodiments, the set of XOR logic gates 1106 is coupled to the syndrome decoder 1104, the set of inverters 308, and the first portion of the memory cells 302a. In some embodiments, each XOR logic gate 1106a, 1106b, . . . , 1106h of the set of XOR logic gates 1106 is coupled to the syndrome decoder 1104 and a corresponding inverter 308a, 308b, . . . , 308h of the set of inverters 308 and a corresponding memory cell (not shown) of the first portion of memory cells 302a, and is configured to generate a corresponding bit of set of output data Dout.

In some embodiments, the set of XOR logic gates 1106 is coupled to the syndrome decoder 1104, the second portion of the memory cells 302b and the set of inverters 508. In some embodiments, each XOR logic gate 1106a, 1106b, . . . , 1106h of the set of XOR logic gates 1106 is coupled to the syndrome decoder 1104 and a corresponding memory cell (not shown) of the second portion of memory cells 302b and a corresponding inverter 508a, 508b, . . . , 508h of the set of inverters 508, and is configured to generate a corresponding bit of set of output data Dout.

Other configurations or logic circuit types for the set of XOR logic gates 1106 are within the scope of the present disclosure.

The NOR logic gate 1108 is coupled between the syndrome decoder 1104 and the AND logic gate 1110. The NOR logic gate 1108 is configured to generate a NOR output signal Nout in response to the error signal Y.

The NOR logic gate 1108 has 72 input terminals configured to receive a corresponding bit of error signal Y. Other numbers of input terminals are within the scope of the present disclosure. For example, in some embodiments, the number of input terminals for NOR logic gate 1108 corresponds to the sum of the number k of check bits generated by ECC encoder 304 and the number of bits of data N of the set of data Din.

Other configurations or logic circuit types for NOR logic gate 1108 are within the scope of the present disclosure.

The AND logic gate 1110 is coupled to the OR logic gate 1102 and the NOR logic gate 1108. An input terminal of the AND logic gate 1110 is coupled to an output terminal of the OR logic gate 1102 and another input terminal of the AND logic gate 1110 is coupled to an output terminal of the NOR logic gate 1108.

The AND logic gate 1110 is configured to generate an uncorrectable error signal FE2 in response to the NOR output signal Nout and the error detected signal FE1. In some embodiments, the uncorrectable error signal FE2 indicates that the error in the set of check bits CB2 and the set of data Din 2 is not correctable.

For example, in some embodiments, the error detected signal FE2 has a value of logic 0 when there is no error in the set of check bits CB2 and the set of data Din2 (e.g., codeword). For example, in some embodiments, the error detected signal FE2 has a value of logic 1 when there is an uncorrectable error in the set of check bits CB2 and the set of data Din2 (e.g., codeword). Other values of error detected signal FE2 are within the scope of the present disclosure. Other configurations or logic circuit types for AND logic gate 1110 are within the scope of the present disclosure.

Other configurations of error logic circuit 1100 are within the scope of the present disclosure. Error logic circuit 1100 achieves the benefits discussed above with respect to integrated circuit 100 of FIG. 1.

Method

Figure 12:
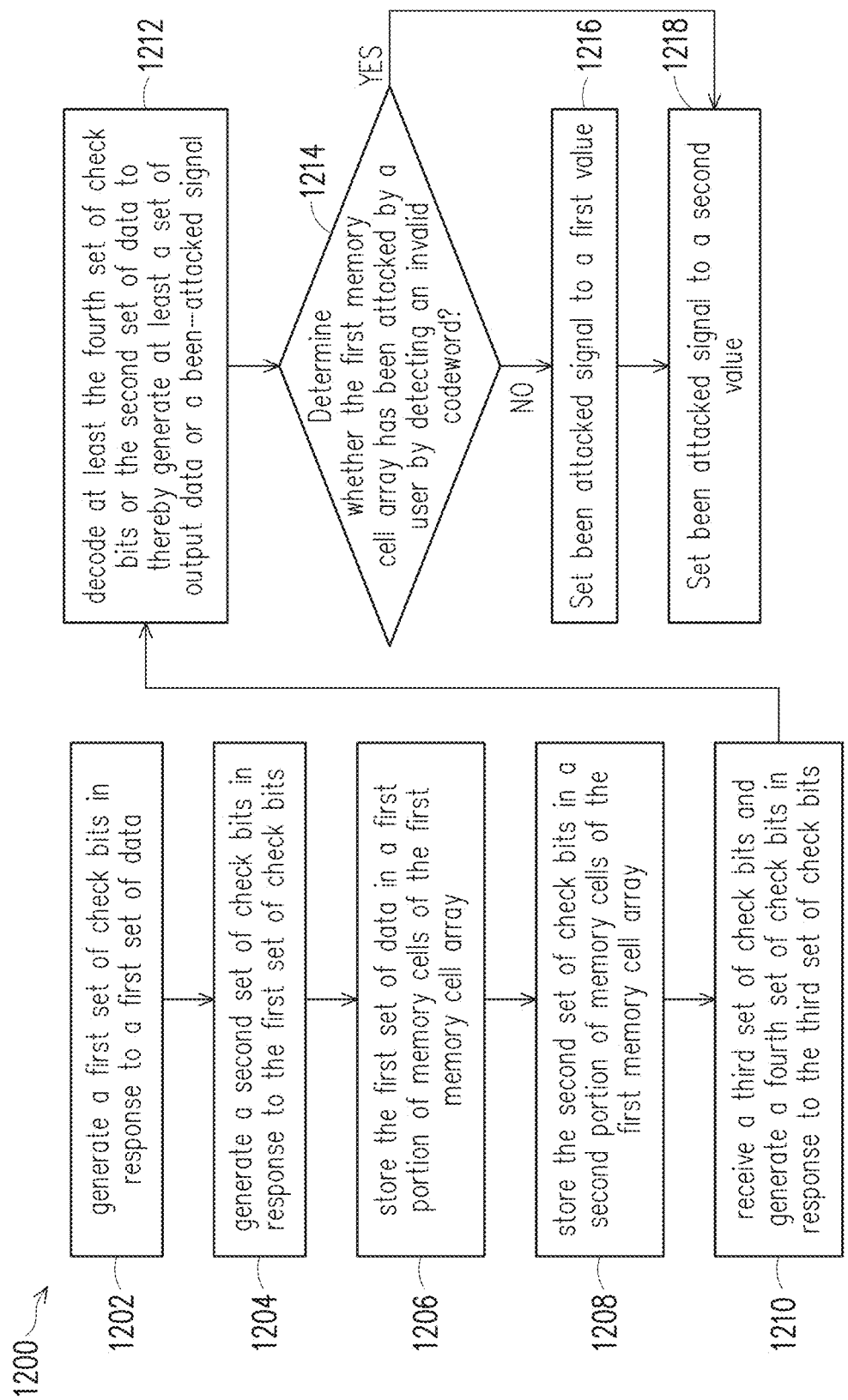
FIG. 12 is a flowchart of a method of operating an integrated circuit, in accordance with some embodiments.

FIG. 12 is a flowchart of a method 1200 of operating an integrated circuit, in accordance with some embodiments.

Figure 14:
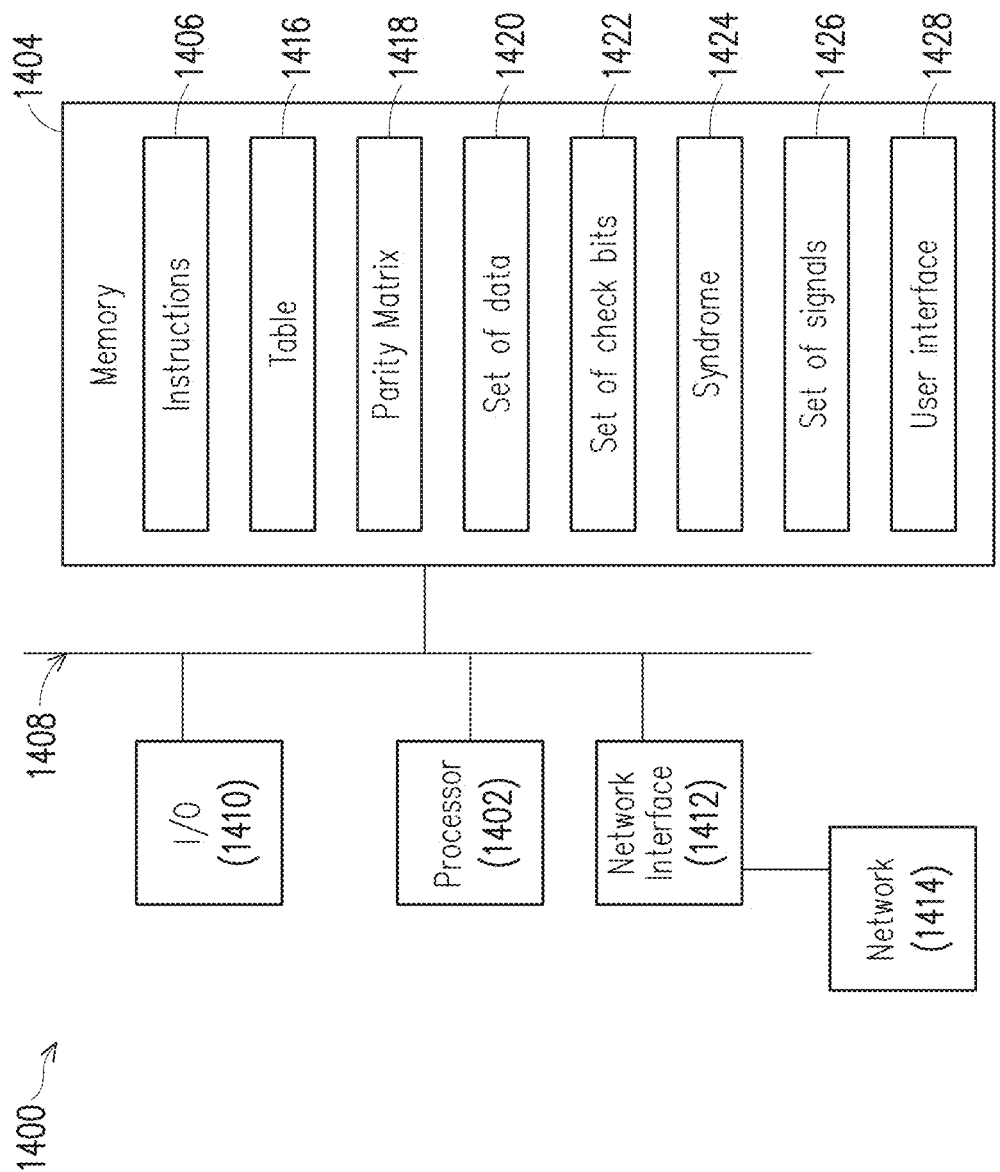
FIG. 14 is a schematic view of a system, in accordance with some embodiments.

In some embodiments, FIG. 12 is a flowchart of a method of operating one or more of integrated circuit 100 of FIG. 1 and integrated circuit 300 of FIG. 3, logic circuit 400 of FIG. 4, XOR trees 800 of FIG. 8, ECC decoder 900 of FIG. 9, syndrome generator 1000 of FIG. 10, error logic circuit 1100 of FIG. 11, and system 1400 of FIG. 14. It is understood that additional operations may be performed before, during, and/or after the method 1200 depicted in FIG. 12, and that some other operations may only be briefly described herein. In some embodiments, other order of operations of method 1200 is within the scope of the present disclosure. In some embodiments, one or more operations of method 1200 are not performed.

In some embodiments, at least method 1200 or 1300 (FIG. 13) is performed after an attempted log-in operation into system 1400 is performed by a user. In some embodiments, at least method 1200 or 1300 is part of a security mechanism implemented by an integrated circuit having a security key useable to provide data integrity in an RFID card, a bank card, a payment card, an ID card, or the like.

Method 1200 includes exemplary operations, but the operations are not necessarily performed in the order shown. Operations may be added, replaced, changed order, and/or eliminated as appropriate, in accordance with the spirit and scope of disclosed embodiments. It is understood that method 1200 utilizes features of one or more of integrated circuit 100 and integrated circuit 300, logic circuit 400, table 700, parity check matrix H, XOR trees 800, ECC decoder 900, syndrome generator 1000, error logic circuit 1100, and system 1400.

In operation 1202 of method 1200, a first set of check bits is generated in response to a first set of data. In some embodiments, the first set of check bits of method 1200 includes at least set of check bits CB1. In some embodiments, the first set of data of method 1200 includes at least set of data Din1. In some embodiments, operation 1202 is performed by ECC encoder 304.

In operation 1204 of method 1200, a second set of check bits is generated in response to the first set of check bits. In some embodiments, at least a part of the second set of check bits is inverted or complementary from at least a part of the first set of check bits. In some embodiments, the first set of inverters is coupled to the ECC encoder.

In some embodiments, the second set of check bits of method 1200 includes at least set of check bits CBB1. In some embodiments, the first set of inverters of method 1200 is the set of inverters 306. In some embodiments, operation 1204 is performed by the set of inverters 306.

In operation 1206 of method 1200, the first set of data of method 1200 is stored in the first portion of memory cells 302a of a first memory cell array. In some embodiments, the first memory cell array is memory cell array 302.

In operation 1208 of method 1200, the second set of check bits is stored in the second portion 302b of memory cells of the first memory cell array. In some embodiments, the second portion 302b of the memory cells is coupled to the first set of inverters.

In operation 1210 of method 1200, a third set of check bits is received, and a fourth set of check bits is generated in response to the third set of check bits.

In some embodiments, the third set of check bits is received by a second set of inverters. In some embodiments, the fourth set of check bits is generated by the second set of inverters. In some embodiments, the second set of inverters of method 1200 is the set of inverters 308. In some embodiments, operation 1210 is performed by the set of inverters 308.

In some embodiments, the third set of check bits of method 1200 includes at least set of check bits CBB2. In some embodiments, the fourth set of check bits of method 1200 includes at least set of check bits CB2.

In some embodiments, at least a part of the fourth set of check bits is inverted from at least a part of the third set of check bits. In some embodiments, the third set of check bits corresponds to the second set of check bits stored in the second portion 302b of memory cells. In some embodiments, the second set of inverters is coupled to the second portion 302b of memory cells.

In operation 1212 of method 1200, at least a second set of data or the fourth set of check bits is decoded thereby generating at least a set of output data or a been-attacked signal. In some embodiments, the been-attacked signal indicates a reset attack by a user. In some embodiments, the ECC decoder of method 1200 is coupled to the second set of inverters and the first portion 302a of the memory cells.

In some embodiments, the second set of data of method 1200 includes the set of data Din2. In some embodiments, the second set of data of method 1200 corresponds to the first set of data stored in the first portion 302a of memory cells.

In some embodiments, the set of output data of method 1200 includes at least the set of output data Dout. In some embodiments, the been-attacked signal of method 1200 includes at least been-attacked signal BAS.

In some embodiments, operation 1212 is performed by at least ECC decoder 310 or ECC decoder 900. In some embodiments, at least portions of operation 1212 is performed by at least syndrome generator 1000 and error logic circuit 1100.

In operation 1214 of method 1200, a determination is made whether the first memory cell array has been attacked by the user by detecting an invalid codeword. In some embodiments, the invalid codeword of method 1200 includes the fourth set of check bits and the second set of data.

In some embodiments, operation 1214 is performed by a first logic circuit. In some embodiments, the first logic circuit of method 1200 is logic circuit 400. In some embodiments, the first logic circuit is coupled to the second set of inverters and the first portion 302a of memory cells.

In some embodiments, the determination of operation 1214 is performed by logic circuit 400 or system 1400.

In some embodiments, operation 1214 of method 1200 includes at least generating, by a third set of inverters, a fifth set of check bits in response to the fourth set of check bits, and generating, by a first NOR logic circuit, the been-attacked signal in response to the fifth set of check bits and the second set of data.

In some embodiments, the fifth set of check bits of method 1200 includes at least set of check bits CBB3. In some embodiments, the third set of inverters of method 1200 is the set of inverters 408. In some embodiments, the first NOR logic circuit of method 1200 is NOR logic gate 412.

In some embodiments, the fifth set of check bits is inverted from the fourth set of check bits. In some embodiments, the third set of inverters is coupled to the second set of inverters. In some embodiments, the first NOR logic circuit is coupled to the first portion 302a of memory cells and the third set of inverters.

In some embodiments, if the determination of operation 1214 is a "no", and method 1200 proceeds to operation 1216.

In some embodiments, if the determination of operation 1214 is a "yes", and method 1200 proceeds to operation 1218.

In operation 1216 of method 1200, the been-attacked signal BAS is set to a first value. In some embodiments, the first value is a logic 1. In some embodiments, the first value is a logic 0.

In operation 1218 of method 1200, the been-attacked signal BAS is set to a second value opposite from the first value. In some embodiments, the second value is a logic 0. In some embodiments, the second value is a logic 1. In some embodiments, the first value or the second value corresponds to more than a single bit of data.

In some embodiments, operations 1216 and 1218 are performed by logic circuit 400. In some embodiments, operations 1216 and 1218 are performed by system 1400.

In some embodiments, after operation 1216 or 1218, method 1200 remains in an idle state until the log-in timer expires.

By operating at least method 1200 or 1300, the integrated circuit operates to achieve the benefits discussed above with respect to integrated circuit 100.

Figure 13:
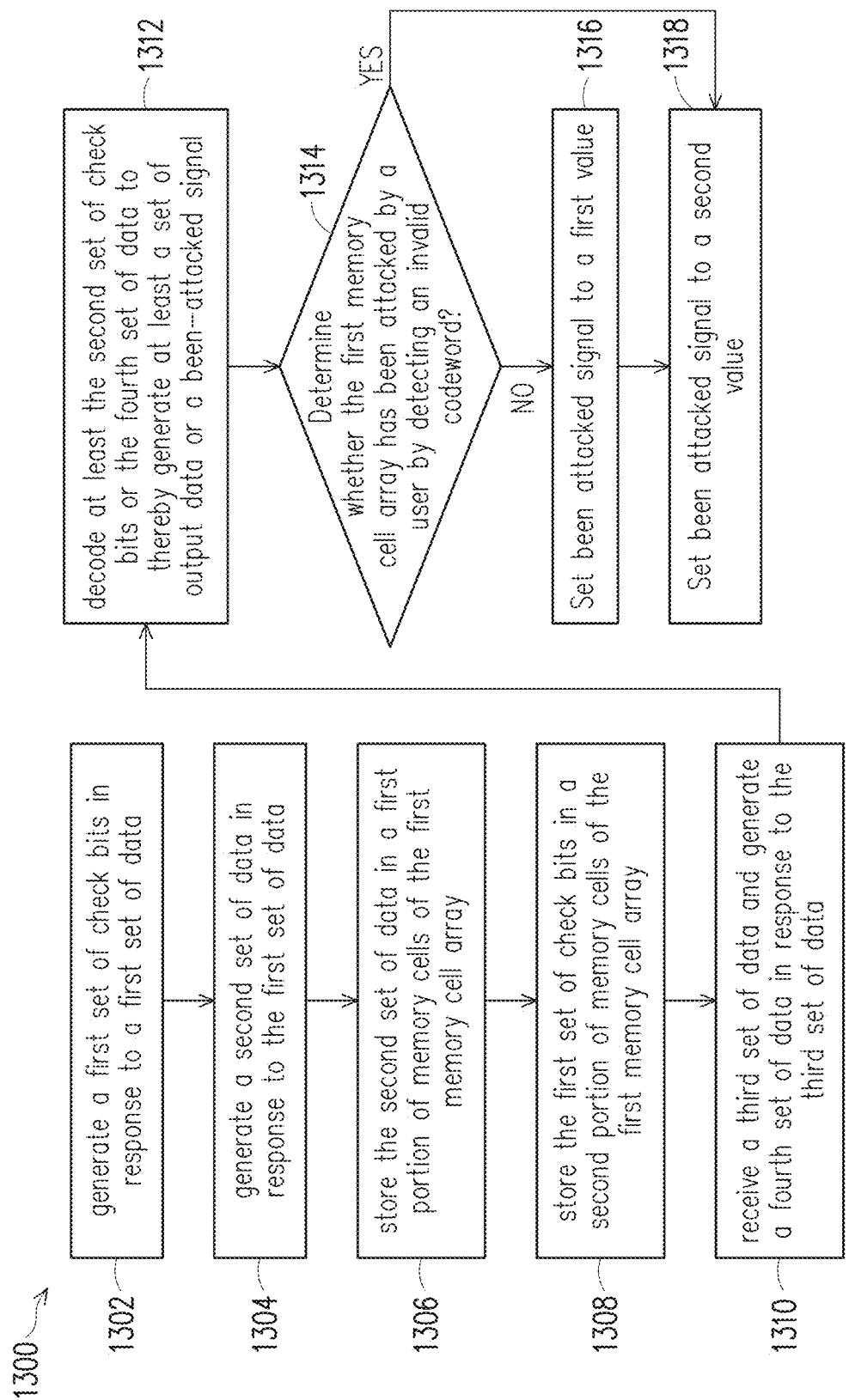
FIG. 13 is a flowchart of a method of operating an integrated circuit, in accordance with some embodiments.

FIG. 13 is a flowchart of a method 1300 of operating an integrated circuit, in accordance with some embodiments.

In some embodiments, FIG. 13 is a flowchart of a method of operating one or more of integrated circuit 100 of FIG. 1 and integrated circuit 500 of FIG. 5, logic circuit 600 of FIG. 6, XOR trees 800 of FIG. 8, ECC decoder 900 of FIG. 9, syndrome generator 1000 of FIG. 10, error logic circuit 1100 of FIG. 11, and system 1400 of FIG. 14. It is understood that additional operations may be performed before, during, and/or after the method 1300 depicted in FIG. 13, and that some other operations may only be briefly described herein. In some embodiments, other order of operations of method 1300 is within the scope of the present disclosure. In some embodiments, one or more operations of method 1300 are not performed.

Method 1300 includes exemplary operations, but the operations are not necessarily performed in the order shown. Operations may be added, replaced, changed order, and/or eliminated as appropriate, in accordance with the spirit and scope of disclosed embodiments. It is understood that method 1300 utilizes features of one or more of integrated circuit 100 and integrated circuit 500, logic circuit 600, table 700, parity check matrix H, XOR trees 800, ECC decoder 900, syndrome generator 1000, error logic circuit 1100, and system 1400.

In operation 1302 of method 1300, a first set of check bits is generated in response to a first set of data. In some embodiments, the first set of check bits of method 1300 includes at least set of check bits CB1. In some embodiments, the first set of data of method 1300 includes at least set of data Din1. In some embodiments, operation 1302 is performed by ECC encoder 304.

In operation 1304 of method 1300, a second set of data is generated in response to the first set of data. In some embodiments, at least a part of the second set of data is inverted or complementary from at least a part of the first set of data.

In some embodiments, the second set of data of method 1300 includes at least set of data Dinb1. In some embodiments, the first set of inverters of method 1300 is the set of inverters 506. In some embodiments, operation 1304 is performed by the set of inverters 506.

In operation 1306 of method 1300, the second set of data of method 1300 is stored in the first portion 302a of memory cells of a first memory cell array. In some embodiments, the first memory cell array is memory cell array 302. In some embodiments, the first portion 302a of the memory cells is coupled to the first set of inverters.

In operation 1308 of method 1300, the first set of check bits is stored in the second portion 302b of memory cells of the first memory cell array. In some embodiments, the second portion 302b of the memory cells is coupled to the ECC encoder 304.

In operation 1310 of method 1300, a third set of data is received, and a fourth set of data is generated in response to the third set of data.

In some embodiments, the third set of data is received by a second set of inverters. In some embodiments, the fourth set of data is generated by the second set of inverters. In some embodiments, the second set of inverters of method 1300 is the set of inverters 508. In some embodiments, operation 1310 is performed by the set of inverters 508.

In some embodiments, the third set of data of method 1300 includes at least set of data Dinb2. In some embodiments, the fourth set of data of method 1300 includes at least set of data Din2.

In some embodiments, at least a part of the fourth set of data is inverted from at least a part of the third set of data. In some embodiments, the third set of data corresponds to the second set of data stored in the first portion 302*a* of memory cells. In some embodiments, the second set of inverters is coupled to the first portion 302*a* of memory cells.

In operation 1312 of method 1300, at least a second set of check bits or the fourth set of data is decoded thereby generating at least a set of output data or a been-attacked signal. In some embodiments, the been-attacked signal indicates a reset attack by a user. In some embodiments, the ECC decoder of method 1300 is coupled to the second set of inverters and the second portion 302*b* of the memory cells.

In some embodiments, the second set of check bits of method 1300 includes the set of check bits CB2. In some embodiments, the second set of check bits of method 1300 corresponds to the first set of check bits stored in the second portion 302*b* of memory cells.

In some embodiments, the set of output data of method 1300 includes at least the set of output data Dout. In some embodiments, the been-attacked signal of method 1300 includes at least been-attacked signal BAS.

In some embodiments, operation 1312 is performed by at least ECC decoder 310 or ECC decoder 900. In some embodiments, at least portions of operation 1312 is performed by at least syndrome generator 1000 and error logic circuit 1100.

In operation 1314 of method 1300, a determination is made whether the first memory cell array has been attacked by the user by detecting an invalid codeword. In some embodiments, the invalid codeword of method 1300 includes the fourth set of data and the second set of check bits.

In some embodiments, operation 1314 is performed by a first logic circuit. In some embodiments, the first logic circuit of method 1300 is logic circuit 600. In some embodiments, the first logic circuit is coupled to the second set of inverters and the second portion 302*b* of memory cells.

In some embodiments, the determination of operation 1314 is performed by logic circuit 600 or system 1400.

In some embodiments, operation 1314 of method 1300 includes at least generating, by a third set of inverters, a fifth set of data in response to the fourth set of data, and generating, by a first NOR logic circuit, the been-attacked signal in response to the fifth set of data and the second set of check bits.

In some embodiments, the fifth set of data of method 1300 includes at least set of data Dinb3. In some embodiments, the third set of inverters of method 1300 is the set of inverters 608. In some embodiments, the first NOR logic circuit of method 1300 is NOR logic gate 612.

In some embodiments, the fifth set of data is inverted from the fourth set of data. In some embodiments, the third set of inverters is coupled to the second set of inverters. In some embodiments, the first NOR logic circuit is coupled to the second portion 302*b* of memory cells and the third set of inverters.

In some embodiments, if the determination of operation 1314 is a "no", and method 1300 proceeds to operation 1316.

In some embodiments, if the determination of operation 1314 is a "yes", and method 1300 proceeds to operation 1318.

In operation 1316 of method 1300, the been-attacked signal BAS is set to a first value. In some embodiments, the first value is a logic 1. In some embodiments, the first value is a logic 0.

In operation 1318 of method 1300, the been-attacked signal BAS is set to a second value opposite from the first value. In some embodiments, the second value is a logic 0. In some embodiments, the second value is a logic 1. In some embodiments, the first value or the second value corresponds to more than a single bit of data.

In some embodiments, operations 1318 and 1318 are performed by logic circuit 600. In some embodiments, operations 1318 and 1318 are performed by system 1400.

In some embodiments, after operation 1318 or 1318, method 1300 remains in an idle state until the log-in timer expires.

FIG. 14 is a schematic view of a system 1400, in accordance with some embodiments. In some embodiments, system 1400 is an embodiment of at least controller 104 of FIG. 1, or ECC encoder/decoder 110, and similar detailed description is therefore omitted.

In some embodiments, system 1400 is an embodiment of at least integrated circuit 100 of FIG. 1, integrated circuit 300 of FIG. 3, logic circuit 400 of FIG. 4, integrated circuit 500 of FIG. 5, logic circuit 600 of FIG. 6, XOR trees 800 of FIG. 8, ECC decoder 900 of FIG. 9, syndrome generator 1000 of FIG. 10, and error logic circuit 1100 of FIG. 11, and similar detailed description is therefore omitted.

In some embodiments, portions of system 1400 is an embodiment of at least integrated circuit 300 or 500, and similar detailed description is therefore omitted.

In some embodiments, system 1400 is configured to control one or more of controller 104, memory cell array 102 or 202, X-decoder circuit 106, Y-decoder circuit 108, ECC encoder/decoder 110, memory circuit 200, ECC encoder 304, at least set of inverters 306, 308, 506, or 508, ECC decoder 310, logic circuit 400, logic circuit 600, XOR trees 800, ECC decoder 900, syndrome generator 1000, or error logic circuit 1100. In some embodiments, system 1400 is configured to perform one or more operations of method 1200 or method 1300.

System 1400 includes a hardware processor 1402 and a non-transitory, computer readable storage medium 1404 (e.g., memory 1404) encoded with, i.e., storing, the computer program code 1406, i.e., a set of executable instructions 1406.

Computer readable storage medium 1404 is configured for interfacing with at least controller 104, memory cell array 102 or 202, X-decoder circuit 106, Y-decoder circuit 108, ECC encoder/decoder 110, memory circuit 200, ECC encoder 304, at least set of inverters 306, 308, 506, or 508, ECC decoder 310, logic circuit 400, logic circuit 600, XOR trees 800, ECC decoder 900, syndrome generator 1000, or error logic circuit 1100 of FIG. 11.

The processor 1402 is electrically coupled to the computer readable storage medium 1404 by a bus 1408. The processor 1402 is also electrically coupled to an I/O interface 1410 by bus 1408. A network interface 1412 is also electrically connected to the processor 1402 by bus 1408. Network interface 1412 is connected to a network 1414, so that processor 1402 and computer readable storage medium 1404 are capable of connecting to external elements by network 1414. The processor 1402 is configured to execute the computer program code 1406 encoded in the computer readable storage medium 1404 in order to cause system 1400 to be usable for performing a portion or all of the operations as described in at least method 1200 or 1300. In some embodiments, network 1414 is not part of system 1400.

In some embodiments, the processor 1402 is a central processing unit (CPU), a multi-processor, a distributed processing read circuit, an application specific integrated circuit (ASIC), and/or a suitable processing unit.

In some embodiments, the computer readable storage medium 1404 is an electronic, magnetic, optical, electromagnetic, infrared, and/or a semiconductor read circuit (or apparatus or device). For example, the computer readable storage medium 1404 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1404 includes a compact disk-read only memory (CD-ROM), a compact disk-read/write (CD-R/W), and/or a digital video disc (DVD).

In some embodiments, the storage medium 1404 stores the computer program code 1406 configured to cause system 1400 to perform one or more operations of at least method 1200 or 1300. In some embodiments, the storage medium 1404 also stores information used for performing at least method 1200 or 1300 as well as information generated during performing at least method 1200 or 1300, such as table 1416, parity check matrix 1418, set of data 1420, set of check bits 1422, syndrome 1424, set of signals 1426 and user interface 1428, and/or a set of executable instructions to perform one or more operations of at least method 1200 or 1300.

In some embodiments, the storage medium 1404 stores instructions (e.g., computer program code 1406) for interfacing with at least controller 104, memory cell array 102 or 202, X-decoder circuit 106, Y-decoder circuit 108, ECC encoder/decoder 110, memory circuit 200, ECC encoder 304, at least set of inverters 306, 308, 506, or 508, ECC decoder 310, logic circuit 400, logic circuit 600, XOR trees 800, ECC decoder 900, syndrome generator 1000, or error logic circuit 1100. The instructions (e.g., computer program code 1406) enable processor 1402 to generate instructions readable by at least controller 104, memory cell array 102 or 202, X-decoder circuit 106, Y-decoder circuit 108, ECC encoder/decoder 110, memory circuit 200, ECC encoder 304, at least set of inverters 306, 308, 506, or 508, ECC decoder 310, logic circuit 400, logic circuit 600, XOR trees 800, ECC decoder 900, syndrome generator 1000, or error logic circuit 1100 to effectively implement one or more operations of at least method 1200 or 1300 during operation of integrated circuit 100, 300 or 500 or logic circuit 400 or 600.

System 1400 includes I/O interface 1410. I/O interface 1410 is coupled to external circuitry. In some embodiments, I/O interface 1410 includes a keyboard, keypad, mouse, trackball, trackpad, and/or cursor direction keys for communicating information and commands to processor 1402.

System 1400 also includes network interface 1412 coupled to the processor 1402. Network interface 1412 allows system 1400 to communicate with network 1414, to which one or more other computer read circuits are connected. Network interface 1412 includes wireless network interfaces such as BLUETOOTH, WIFI, WIMAX, GPRS, or WCDMA; or wired network interface such as ETHERNET, USB, or IEEE-884. In some embodiments, at least method 1200 or 1300 is implemented in two or more systems 1400, and information such as table, parity check matrix, set of data, set of check bits, syndrome, set of signals and user interface are exchanged between different systems 1400 by network 1414.

System 1400 is configured to receive information related to a table through I/O interface 1410 or network interface 1412. The information is transferred to processor 1402 by bus 1408 to determine table values for generating the parity check matrix H. The table values are then stored in computer readable medium 1404 as table 1416. In some embodiments, table 1416 includes table 700.

System 1400 is configured to receive information related to a parity check matrix through I/O interface 1410 or network interface 1412. The information is stored in computer readable medium 1404 as parity check matrix 1418. In some embodiments, the parity check matrix includes the parity check matrix H of FIG. 7.

System 1400 is configured to receive information related to set of data through I/O interface 1410 or network interface 1412. The information is stored in computer readable medium 1404 as set of data 1420. In some embodiments, the set of data includes at least the set of data Din1, Dinb1, Dinb2, Din2, Dinb3 or Dout of one or more of FIGS. 1-13 or at least method 1200 or 1300.

System 1400 is configured to receive information related to set of check bits through I/O interface 1410 or network interface 1412. The information is stored in computer readable medium 1404 as set of check bits 1422. In some embodiments, the set of check bits includes at least the set of check bits CB1, CBB1, CBB2, CB2, CBB3 or T of one or more of FIGS. 1-13 or at least method 1200 or 1300.

System 1400 is configured to receive information related to a syndrome through I/O interface 1410 or network interface 1412. The information is stored in computer readable medium 1404 as syndrome 1424. In some embodiments, the syndrome includes at least the syndrome S of one or more of FIGS. 1-13 or at least method 1200 or 1300.

System 1400 is configured to receive information related to a set of signals through I/O interface 1410 or network interface 1412. The information is stored in computer readable medium 1404 as set of signals 1426. In some embodiments, the set of signals includes at least the been-attacked signal BAS, error detected signal FE1 or uncorrectable error signal FE2 of one or more of FIGS. 1-13 or at least method 1200 or 1300.

System 1400 is configured to receive information related to a user interface through I/O interface 1410 or network interface 1412. The information is stored in computer readable medium 1404 as user interface 1428.

In some embodiments, at least a portion of method 1200 or 1300 is implemented as a standalone software application for execution by a processor. In some embodiments, at least a portion of method 1200 or 1300 is implemented as a software application that is a part of an additional software application. In some embodiments, at least a portion of method 1200 or 1300 is implemented as a plug-in to a software application. In some embodiments, at least a portion of method 1200 or 1300 is implemented as a software application that is a portion of an ECC tool or authentication tool. In some embodiments, at least a portion of method 1200 or 1300 is implemented as a software application that is used by an ECC or authentication tool. In some embodiments, the authentication tool is used to authenticate credentials of a user of at least memory circuit 100.

In some embodiments, one or more of the operations of method 1200 or 1300 is not performed. Furthermore, various logic circuits shown in FIGS. 1-11 are for illustration purposes. Embodiments of the disclosure are not limited to a particular logic circuits, and one or more of the logic circuits shown in FIGS. 1-11 can be substituted with a one or more corresponding logic circuits of a different function or an equivalent function. Similarly, the low or high logical value of various signals used in the above description is also for illustration. Embodiments of the disclosure are not limited to a particular logical value when a signal is activated and/or deactivated. Selecting different logical values is within the scope of various embodiments. Selecting different numbers of logic circuits in FIGS. 1-11 is within the scope of various embodiments.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

One aspect of this description relates to an integrated circuit. The integrated circuit includes a first set of inverters configured to receive a first set of check bits, and to generate a second set of check bits in response to the first set of check bits, the second set of check bits being inverted from the first set of check bits. In some embodiments, the integrated circuit further includes a first memory cell array. In some embodiments, the first memory cell array includes a first portion of memory cells configured to store a first set of data, and a second portion of memory cells coupled to the first set of inverters, and configured to store the second set of check bits. In some embodiments, the integrated circuit further includes a second set of inverters coupled to the second portion of the memory cells and being configured to receive a third set of check bits, and to generate a fourth set of check bits in response to the third set of check bits, the fourth set of check bits being inverted from the third set of check bits, and the third set of check bits corresponds to the second set of check bits stored in the second portion of the memory cells. In some embodiments, the integrated circuit further includes an error correction code decoder coupled to the second set of inverters and the first portion of the memory cells, and configured to at least detect or correct an error in at least a second set of data or the fourth set of check bits thereby generating at least a set of output data and a been-attacked signal, the second set of data corresponds to the first set of data stored in the first portion of the memory cells, and the been-attacked signal indicating a reset attack by a user.

Yet another aspect of this description relates to an integrated circuit. The integrated circuit includes a first set of inverters configured to receive a first set of data, and to generate a second set of data in response to the first set of data, the second set of data being inverted from the first set of data. In some embodiments, the integrated circuit further includes a first memory cell array. In some embodiments, the first memory cell array includes a first portion of memory cells coupled to the first set of inverters and configured to store the second set of data, and a second portion of memory cells configured to store a first set of check bits. In some embodiments, the integrated circuit further includes a second set of inverters coupled to the first portion of the memory cells and being configured to receive a third set of data, and to generate a fourth set of data in response to the third set of data, the fourth set of data being inverted from the third set of data, and the third set of data corresponds to the second set of data stored in the first portion of the memory cells. In some embodiments, the integrated circuit further includes an ECC decoder coupled to the second set of inverters and the second portion of the memory cells, and configured to at least detect or correct an error in at least the fourth set of data or a second set of check bits thereby generating at least a set of output data and a been-attacked signal, the second set of check bits corresponds to the first set of check bits stored in the second portion of the memory cells, and the been-attacked signal indicating a reset attack by a user.

Still another aspect of this description relates to a method of operating an integrated circuit that includes a first memory cell array. In some embodiments, the method includes generating, by an error correction code (ECC) encoder, a first set of check bits in response to a first set of data. In some embodiments, the method further includes generating, by a first set of inverters, a second set of data in response to the first set of data, the second set of data being inverted from the first set of data, and storing the second set of data in a first portion of memory cells of the first memory cell array, the first portion of the memory cells being coupled to the first set of inverters. In some embodiments, the method further includes storing the first set of check bits in a second portion of memory cells of the first memory cell array. In some embodiments, the method further includes receiving, by a second set of inverters, a third set of data, and generating a fourth set of data in response to the third set of data, the fourth set of data being inverted from the third set of data, and the third set of data corresponds to the second set of data stored in the first portion of the memory cells, the second set of inverters being coupled to the first portion of the memory cells. In some embodiments, the method further includes determining, by a first logic circuit, whether the first memory cell array has been attacked by a user by detecting an invalid codeword, the invalid codeword including the fourth set of data and a second set of check bits, the second set of check bits corresponds to the first set of check bits stored in the second portion of the memory cells, and the first logic circuit being coupled to the second set of inverters and the second portion of the memory cells.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit, comprising:
   a first set of inverters configured to receive a first set of check bits, and to generate a second set of check bits in response to the first set of check bits, the second set of check bits being inverted from the first set of check bits;
   a first memory cell array comprising:
      a first portion of memory cells configured to store a first set of data; and
      a second portion of memory cells coupled to the first set of inverters, and configured to store the second set of check bits;

a second set of inverters coupled to the second portion of the memory cells and being configured to receive a third set of check bits, and to generate a fourth set of check bits in response to the third set of check bits, the fourth set of check bits being inverted from the third set of check bits, and the third set of check bits corresponds to the second set of check bits stored in the second portion of the memory cells; and an error correction code decoder coupled to the second set of inverters and the first portion of the memory cells, and configured to at least detect or correct an error in at least a second set of data or the fourth set of check bits thereby generating at least a set of output data and a been-attacked signal, the second set of data corresponds to the first set of data stored in the first portion of the memory cells, and the been-attacked signal indicating a reset attack by a user.

2. The integrated circuit of claim 1, wherein the ECC decoder comprises:
a first logic circuit configured to determine if the integrated circuit has been attacked by the user by detecting an invalid codeword, the invalid codeword including the fourth set of check bits and the second set of data.

3. The integrated circuit of claim 2, wherein the first logic circuit comprises:
a third set of inverters coupled to the second set of inverters and being configured to generate a fifth set of check bits in response to the fourth set of check bits, the fifth set of check bits being inverted from the fourth set of check bits.

4. The integrated circuit of claim 3, wherein the first logic circuit further comprises:
a first NOR logic circuit coupled to the first portion of the memory cells and the third set of inverters, and configured to generate the been-attacked signal in response to the fifth set of check bits and the second set of data.

5. The integrated circuit of claim 1, wherein the ECC decoder comprises:
a syndrome generator coupled to the second set of inverters and the first portion of the memory cells, and configured to generate a syndrome vector in response to the second set of data and the fourth set of check bits.

6. The integrated circuit of claim 5, wherein the ECC decoder further comprises:
an error detection/correction logic circuit coupled to the syndrome generator and the first portion of the memory cells, and configured to generate the set of output data in response to at least the second set of data and the syndrome vector.

7. The integrated circuit of claim 1, wherein the first memory cell array includes:
magnetoresistive random-access memory (MRAM); or
phase-change RAM (PRAM).

8. An integrated circuit, comprising:
a first set of inverters configured to receive a first set of data, and to generate a second set of data in response to the first set of data, the second set of data being inverted from the first set of data;
a first memory cell array comprising:
a first portion of memory cells coupled to the first set of inverters and configured to store the second set of data; and
a second portion of memory cells configured to store a first set of check bits;
a second set of inverters coupled to the first portion of the memory cells and being configured to receive a third set of data, and to generate a fourth set of data in response to the third set of data, the fourth set of data being inverted from the third set of data, and the third set of data corresponds to the second set of data stored in the first portion of the memory cells; and an ECC decoder coupled to the second set of inverters and the second portion of the memory cells, and configured to at least detect or correct an error in at least the fourth set of data or a second set of check bits thereby generating at least a set of output data and a been-attacked signal, the second set of check bits corresponds to the first set of check bits stored in the second portion of the memory cells, and the been-attacked signal indicating a reset attack by a user.

9. The integrated circuit of claim 8, wherein the ECC decoder comprises:
a first logic circuit configured to determine if the integrated circuit has been attacked by the user by detecting an invalid codeword, the invalid codeword including the second set of check bits and the fourth set of data.

10. The integrated circuit of claim 9, wherein the first logic circuit comprises:
a third set of inverters coupled to the second set of inverters and being configured to generate a fifth set of data in response to the fourth set of data, the fifth set of data being inverted from the fourth set of data.

11. The integrated circuit of claim 10, wherein the first logic circuit further comprises:
a first NOR logic circuit coupled to the second portion of the memory cells and the third set of inverters, and configured to generate the been-attacked signal in response to the second set of check bits and the fifth set of data.

12. The integrated circuit of claim 8, wherein the ECC decoder comprises:
a syndrome generator coupled to the second set of inverters and the second portion of the memory cells, and configured to generate a syndrome vector in response to the fourth set of data and the second set of check bits.

13. The integrated circuit of claim 12, wherein the ECC decoder further comprises:
an error detection/correction logic circuit coupled to the syndrome generator and the second portion of the memory cells, and configured to generate the set of output data in response to at least the fourth set of data and the syndrome vector.

14. The integrated circuit of claim 13, wherein the error detection/correction logic circuit comprises:
an OR logic gate coupled to the syndrome generator and configured to generate an error detected signal in response to the syndrome vector, the error detected signal indicating whether the error in the second set of check bits and the fourth set of data is detected.

15. The integrated circuit of claim 14, wherein the error detection/correction logic circuit further comprises:
a syndrome decoder coupled to the syndrome generator, and configured to generate an error signal in response to the syndrome vector, the error signal identifying at least a location of the error in the second set of check bits and the fourth set of data; and
a set of exclusive OR (XOR) gates coupled to the syndrome decoder, the second portion of the memory cells and the second set of inverters, and configured to generate the set of output data in response to the error signal, the fourth set of data and the second set of check bits.

16. The integrated circuit of claim 15, wherein the error detection/correction logic circuit further comprises:
- a NOR logic gate coupled to the syndrome decoder, and configured to generate a NOR output signal in response to the error signal; and
- an AND logic gate coupled to the OR logic gate and the NOR logic gate, and configured to generate an uncorrectable error signal in response to the NOR output signal and the error detected signal, the uncorrectable error signal indicating the error in the second set of check bits and the fourth set of data is not correctable.

17. The integrated circuit of claim 13, wherein the syndrome generator comprises:
- a set of exclusive OR (XOR) trees coupled to the second set of inverters and configured to generate another set of check bits in response to the fourth set of data, each XOR tree of the set of XOR trees being configured to generate a corresponding check bit of the another set of check bits in response to the fourth set of data; and
- a set of XOR gates coupled to the set of XOR trees and the second portion of the memory cells, and configured to generate the syndrome vector in response to the second set of check bits and the another set of check bits, each XOR gate of the set of XOR gates being coupled to a corresponding XOR tree of the set of XOR trees, and configured to generate a corresponding syndrome bit of the syndrome vector.

18. A method of operating an integrated circuit, the integrated circuit including a first memory cell array, the method comprising:
- generating, by an error correction code (ECC) encoder, a first set of check bits in response to a first set of data;
- generating, by a first set of inverters, a second set of data in response to the first set of data, the second set of data being inverted from the first set of data;
- storing the second set of data in a first portion of memory cells of the first memory cell array, the first portion of the memory cells being coupled to the first set of inverters;
- storing the first set of check bits in a second portion of memory cells of the first memory cell array;
- receiving, by a second set of inverters, a third set of data, and generating a fourth set of data in response to the third set of data, the fourth set of data being inverted from the third set of data, and the third set of data corresponds to the second set of data stored in the first portion of the memory cells, the second set of inverters being coupled to the first portion of the memory cells; and
- determining, by a first logic circuit, whether the first memory cell array has been attacked by a user by detecting an invalid codeword, the invalid codeword including the fourth set of data and a second set of check bits, the second set of check bits corresponds to the first set of check bits stored in the second portion of the memory cells, and the first logic circuit being coupled to the second set of inverters and the second portion of the memory cells.

19. The method of claim 18, further comprising:
- decoding, by an ECC decoder, at least the second set of check bits or the fourth set of data thereby generating at least a set of output data or a been-attacked signal, the been-attacked signal indicating a reset attack by the user, and the ECC decoder being coupled to the second set of inverters and the second portion of the memory cells.

20. The method of claim 18, wherein determining whether the first memory cell array has been attacked by the user comprises:
- generating, by a third set of inverters, a fifth set of data in response to the fourth set of data, the fifth set of data being inverted from the fourth set of data, and the third set of inverters being coupled to the second set of inverters; and
- generating, by a first NOR logic circuit, a been-attacked signal in response to the fifth set of data and the second set of check bits, the first NOR logic circuit being coupled to the second portion of the memory cells and the third set of inverters, the been-attacked signal indicating a reset attack by the user.

* * * * *